(12) United States Patent
Yamazaki

(10) Patent No.: US 8,370,760 B2
(45) Date of Patent: Feb. 5, 2013

(54) INFORMATION PROCESSING APPARATUS, INFORMATION PROCESSING METHOD AND PROGRAM

(75) Inventor: Keiko Yamazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 12/567,899

(22) Filed: Sep. 28, 2009

(65) Prior Publication Data

US 2010/0082514 A1    Apr. 1, 2010

(30) Foreign Application Priority Data

Sep. 30, 2008  (JP) ................ P2008-254609

(51) Int. Cl.
G06F 3/048  (2006.01)
(52) U.S. Cl. ..... 715/764; 715/810; 705/14.4; 705/14.68
(58) Field of Classification Search ............ 715/764, 715/810; 705/14.4, 14.9
See application file for complete search history.

(56) References Cited

U.S. PATENT DOCUMENTS

| | | | | |
|---|---|---|---|---|
| 6,507,949 | B1 * | 1/2003 | Jonason et al. ............. | 725/22 |
| 2002/0095334 | A1 * | 7/2002 | Kao ............................ | 705/14 |
| 2003/0105670 | A1 * | 6/2003 | Karakawa et al. ........... | 705/14 |
| 2004/0119602 | A1 * | 6/2004 | Blum et al. ................. | 340/815.4 |
| 2004/0192351 | A1 * | 9/2004 | Duncan ....................... | 455/456.3 |
| 2006/0149623 | A1 * | 7/2006 | Badros et al. ............... | 705/14 |
| 2006/0287913 | A1 * | 12/2006 | Baluja ......................... | 705/14 |
| 2007/0005420 | A1 * | 1/2007 | Roy et al. ................... | 705/14 |
| 2007/0112627 | A1 * | 5/2007 | Jacobs et al. ............... | 705/14 |
| 2007/0233554 | A1 * | 10/2007 | Sakai et al. ................. | 705/13 |
| 2008/0097824 | A1 * | 4/2008 | Julien et al. ................ | 705/10 |

(Continued)

FOREIGN PATENT DOCUMENTS

JP  2001-297247  10/2001
JP  2002 297077  10/2002

(Continued)

OTHER PUBLICATIONS

POPAI Digital Signage Standards Committe: "POPAI Digital Signage Group Standard Terminology", Oct. 17, 2005, XP002665106, Retrieved from the Internet: URL:http://popai.com/docs/DS/POPAI%20DigSignage%20Standard%20TermsRev%201_0.pdf [retrieved on Dec. 5, 2011].

(Continued)

*Primary Examiner* — Tuyetlien Tran
(74) *Attorney, Agent, or Firm* — Frommer Lawrence & Haug LLP; William S. Frommer; Thomas F. Presson

(57) ABSTRACT

Necessary display count information about a count that predetermined content data should be displayed in a predetermined display device in a displayable period is acquired, display result count information about the display result count that the predetermined content data is displayed between a start of the displayable period and a present time is acquired, the display estimated count that the predetermined content data should be displayed in any period of the displayable period from the present time is decided based on the displayable period, the necessary display count information, and the display result count information, display time zone information about time zones in which the predetermined content data can be displayed in the predetermined display device is acquired, and a display start time at which the content data is displayed in the predetermined display device is decided based on the display estimated count and the display time zone information.

6 Claims, 24 Drawing Sheets

U.S. PATENT DOCUMENTS

2009/0247190 A1* 10/2009 Miyazawa et al. ......... 455/456.3
2010/0082428 A1* 4/2010 Vassilvitskii et al. ...... 705/14.49

FOREIGN PATENT DOCUMENTS

| JP | 2002 538643 | 11/2002 |
| JP | 2008 527499 | 7/2008 |
| WO | WO 00/51102 | 8/2000 |

OTHER PUBLICATIONS

Search Report issued on Dec. 21, 2011 in corresponding European application No. 09252136.8.
Search Report issued on Jan. 9, 2012 in corresponding European application No. 09252136.8.

* cited by examiner

FIG.17

| CONTENT REGISTRATION | | | |
|---|---|---|---|
| CONTENT CASE NAME | CLIENT A (COFFEE DRINK) — 551 | | |
| ADVERTISER | CLIENT A — 552 | | |
| PRODUCT CLASSIFICATION | COFFEE DRINK — 553 | | |
| PRODUCT NAME | ooo — 554 | | |

DISPLAY CONDITIONS (AUTOMATIC ALLOCATION CONDITIONS)    555

| TARGET CHANNEL | CONTRACT PERIOD | | CONTRACT COUNT |
|---|---|---|---|
| ☐ BARGAIN CHANNEL - TYPE B | | ~ | |
| ☐ BARGAIN CHANNEL - TYPE C | | ~ | |

SAVE — 556    CANCEL — 557

AUTOMATIC ALLOCATION CONFIRMATION — 508

TARGET CHANNEL: BARGAIN CHANNEL - TYPE B
CONTRACT PERIOD: 2008/01/01~2008/01/20
NUMBER OF DISPLAY UNITS:
CONTENT DISPLAY CONDITIONS:

581

| CONTENT CASE NAME | CONTRACT COUNT | MARGIN | RESULT COUNT | ALLOCATION COUNT | REMAINING ALLOCATION COUNT | NECESSARY ALLOCATION COUNT | EXECUTION RESULT COUNT |
|---|---|---|---|---|---|---|---|
| ☐ XXX CONTENT CASE 01 | 2000 | 2% | 500 | 1250 | 750 | - | - |
| ☐ OOOOO CONTENT CASE 01-A | 2500 | 3% | 1000 | 1750 | 750 | - | - |
| ☐ BB CASE | 2000 | 2% | 500 | 1250 | 750 | - | - |

EXECUTE — 582
CANCEL — 583

FIG.21

AUTOMATIC ALLOCATION RESULT

TARGET CHANNEL: BARGAIN CHANNEL - TYPE B
CONTRACT PERIOD: 2008/01/01~2008/01/20
NUMBER OF DISPLAY UNITS:

CONTENT DISPLAY CONDITIONS:

| CONTENT CASE NAME | CONTRACT COUNT | MARGIN | RESULT COUNT | ALLOCATION COUNT | REMAINING ALLOCATION COUNT | NECESSARY ALLOCATION COUNT | EXECUTION RESULT COUNT |
|---|---|---|---|---|---|---|---|
| ☑ XXX CONTENT CASE 01 | 2000 | 2% | 500 | 1250 | 750 | 150 | 150 |
| ☑ ○○○○○ CONTENT CASE 01-A | 2500 | 3% | 1000 | 1750 | 750 | 200 | 150 |
| ☑ BB CASE | 2000 | 2% | 500 | 1250 | 750 | 150 | 150 |

591

DETAILS OF RESULT:

○○○○○ CONTENT CASE 01-A IS NG BECAUSE EXECUTION RESULT COUNT IS LESS THAN NECESSARY ALLOCATION COUNT

592

509

INFORMATION PROCESSING APPARATUS, INFORMATION PROCESSING METHOD AND PROGRAM

BACKGROUND OF THE INVENTION

1. Field of the Invention

The present invention related to an information processing apparatus, an information processing method, and a program.

2. Description of the Related Art

For example, a system called digital signage or the like displays video, character information and the like in a display device such as a liquid crystal display installed in public facilities or commercial facilities such as shops. A display device by digital signage displays, for example, advertisements, emergency information or the like. Content data used for the display of a display device may be recorded for each display device via a memory card or delivered from a management server connected to the display device via a network.

Customers visiting public facilities or commercial facilities such as shops change depending on the location, time zone, day of the week and the like. Therefore, if content displayed in a display device is advertisements, the effectiveness of advertising can still be enhanced by displaying content of advertisements of products, services and the like depending on the location where the display device is installed and the time zone and day of the week when advertisements are displayed. Japanese Patent Application Laid-Open No. 2001-297247 discloses a technology that effectively selects advertising media (selection of programs to be sponsored in TV broadcasting) and decides the time interval to be invested for advertising.

SUMMARY OF THE INVENTION

Incidentally, it is necessary for the display of advertisements by digital signage to respond to requests from advertisers and thus, when a time table for the advertisement display is scheduled, it is necessary to satisfy various scheduling conditions. Scheduling conditions include, for example, the display count of advertising content data in each display device. It is also necessary to display content data in such a way that a combination of content data of some specific product type or genre should not arise successively along the time axis or in neighboring locations. Further, it is necessary to display content data in such a way that a combination of content data of rival enterprises or products in the same type of business should not arise successively along the time axis or in neighboring locations. Scheduling conditions include such exclusive conditions concerning the display of such content data.

However, scheduling a time table so as to satisfy all these conditions and registering the scheduled time table with a system is very time-consuming work for the administrator. Moreover, if the types of content data increase, a time table satisfying scheduling conditions becomes more complex, making time table scheduling more difficult. As a result, there is an issue that human errors in scheduling work are more likely to occur.

The present invention has been made in view of the above issue and it is desirable to provide a novel and improved information processing apparatus capable of generating a time table swiftly and concisely while satisfying scheduling conditions for content data, an information processing method, and a program.

According to an embodiment of the present invention, there is provided an information processing apparatus including: a necessary display count acquisition unit that acquires necessary display count information about a count that predetermined content data should be displayed in a predetermined display device in a displayable period of the predetermined content data; a display result count acquisition unit that acquires display result count information about the display result count that the predetermined content data is displayed in the predetermined display device between a start of the displayable period and a present time; a display estimated count decision unit that decides the display estimated count that the predetermined content data should be displayed in the predetermined display device in any period of the displayable period from the present time based on the displayable period, the necessary display count information, and the display result count information; a display time zone acquisition unit that acquires display time zone information about time zones in which the predetermined content data can be displayed in the predetermined display device, and a display start time decision unit that decides a display start time at which the content data is displayed in the predetermined display device based on the display estimated count and the display time zone information.

An information processing apparatus may include a continuous display determination unit that determines whether the predetermined content data can be displayed continuously before or after other content data along a time axis based on attributes of the content data, wherein the display start time decision unit may decide the display start time based on a determination result of the continuous display determination unit.

The information processing apparatus may include a proximity display determination unit that determines, when the predetermined display device is adjacent to another display device, whether the predetermined content data displayed in the predetermined display device can be displayed simultaneously with other content data displayed in the other display device or continuously before or after other content data along a time axis on the attributes of content data, wherein the display start time decision unit may decide the display start time based on a determination result of the proximity display determination unit.

The information processing apparatus may include a display date attribute acquisition unit that acquires display date attribute information about attributes of dates on which the predetermined content data can be displayed in the predetermined display device, wherein the display start time decision unit may decide the display start time based on the display date attributes.

Furthermore, according to another embodiment of the present invention, there is provided an information processing method including the steps of: acquiring necessary display count information about a count that predetermined content data should be displayed in a predetermined display device in a displayable period of the predetermined content data; acquiring display result count information about the display result count that the predetermined content data is displayed in the predetermined display device between a start of the displayable period and a present time; deciding the display estimated count that the predetermined content data should be displayed in the predetermined display device in any period of the displayable period from the present time based on the displayable period, the necessary display count information, and the display result count information; acquiring display time zone information about time zones in which the predetermined content data can be displayed in the predetermined display device, and deciding a display start time at which the content data is displayed in the predetermined display device based on the display estimated count and the display time zone information.

Furthermore, according to another embodiment of the present invention, there is provided a program causing a computer to function as units including means for acquiring necessary display count information about a count that predetermined content data should be displayed in a predetermined display device in a displayable period of the predetermined content data; means for acquiring display result count information about the display result count that the predetermined content data is displayed in the predetermined display device between a start of the displayable period and a present time; means for deciding the display estimated count that the predetermined content data should be displayed in the predetermined display device in any period of the displayable period from the present time based on the displayable period, the necessary display count information, and the display result count information; means for acquiring display time zone information about time zones in which the predetermined content data can be displayed in the predetermined display device, and means for deciding a display start time at which the content data is displayed in the predetermined display device based on the display estimated count and the display time zone information.

According to the embodiments of the present invention, a time table can be generated swiftly and concisely while satisfying scheduling conditions for content data.

BRIEF DESCRIPTION OF THE DRAWINGS

FIG. 17 is an explanatory view showing a content registration screen in the embodiment;
FIG. 20 is an explanatory view showing an automatic allocation confirmation screen in the embodiment;
FIG. 21 is an explanatory view showing an automatic allocation result confirmation screen in the embodiment.

DETAILED DESCRIPTION OF EMBODIMENT

Figure 1:
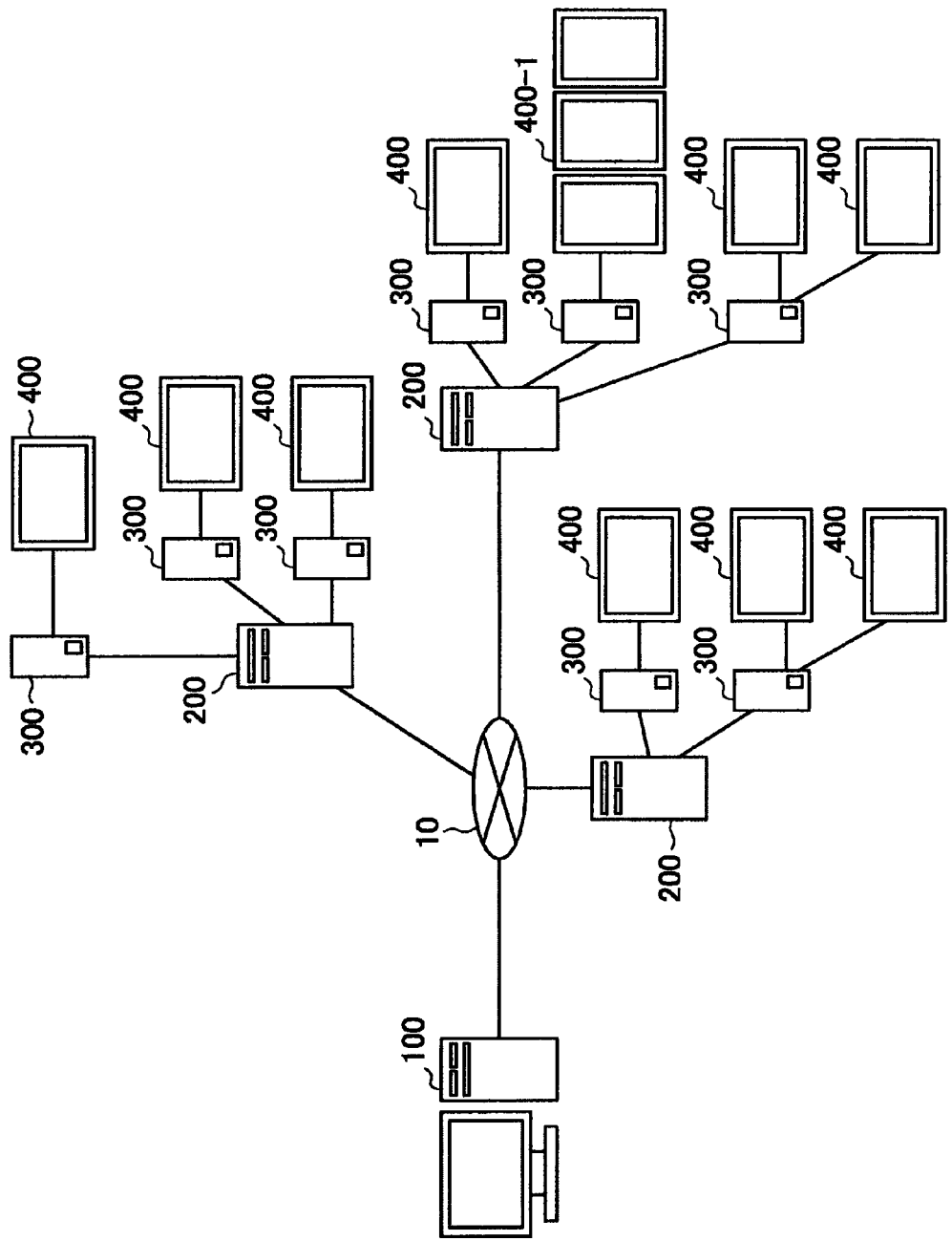
FIG. 1 is an explanatory view showing the configuration of a digital signage providing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description will be provided in the order shown below:

1. First Embodiment
[Overview of a digital signage providing system]
[Configuration of the digital signage providing system]
[Time table]
[Generation of a time table]
[Automatic content scheduling processing]
[Automatic scheduling processing at step S207]
[Allocation processing of content cases to the allocation frame (specified time) at step S303]
[Exclusion conditions]
[Relationship between the display count and the number of display devices 400]
[Screen display when a time table is generated]
1. <First Embodiment>
[Overview of a Digital Signage Providing System]

First, a digital signage providing system according to the first embodiment of the present invention will be described.

Figure 24:
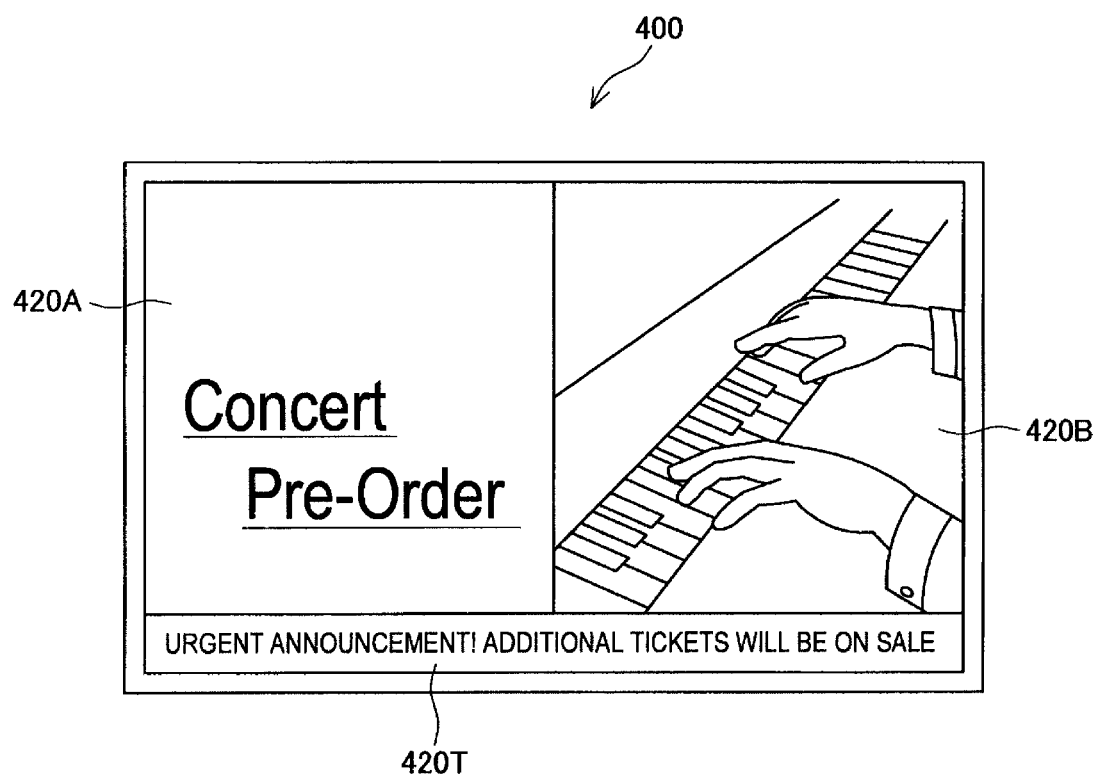
FIG. 24 is an explanatory view exemplifying a screen of the display device according to the embodiment.

The digital signage providing system displays content such as video and character information in the display device 400 such as a liquid crystal display installed in public facilities or commercial facilities such as shops. The display device 400 may display not only one type of content in the screen, but also, as shown in FIG. 24, divide the screen to display two types of video information, 420A and 420B. The display device 400 may display character information as a telop 420T. FIG. 24 is an explanatory view exemplifying the screen of the display device 400 according to the present embodiment.

A digital signage providing system according to the present embodiment is capable of generating a time table. A time table in the present embodiment is schedule information that specifies the order of display, display start time and the like of a plurality of pieces of content data that will be displayed in the predetermined display device 400 in the future. Here, content data is video information or character information of advertisements, event announcements, delivery programs and the like. Time table generation needs to satisfy various scheduling conditions because it is necessary to respond to requests from advertisers and installers who installed the display device 400 when content data is scheduled.

Scheduling conditions is, for example, the contract display count (necessary display count) of advertising content in each of the display devices 400 within some contract period. It is also necessary to display content data in such a way that a combination of content data of some specific product type or genre should not arise successively along the time axis or in neighboring locations. Further, it is necessary to display content data in such a way that a combination of content data of rival enterprises or products in the same type of business should not arise successively along the time axis or in neighboring locations. Thus, scheduling conditions include exclusive conditions concerning the display of content data.

Customers visiting public facilities or commercial facilities such as shops change depending on the location, time zone, day of the week and the like. Therefore, if content displayed in the display device 400 is advertisements, the effectiveness of advertising can still be enhanced by displaying content of advertisements of products, services and the like depending on the location where the display device 400 is installed and the time zone and day of the week when advertisements are displayed. Thus, scheduling conditions include conditions for the location where content is displayed, time zone, day of the week and the like.

A digital signage providing system according to the present embodiment generates a time table of content data for a predetermined display device by considering the contract display count, display result count, and scheduling conditions.

[Configuration of the Digital Signage Providing System]

First, the configuration of the digital signage providing system according to the present embodiment will be described. FIG. 1 is an explanatory view showing the configuration of a digital signage providing system according to the present embodiment.

The digital signage providing system includes, for example, a management server 100 connected to a network 10, one or a plurality of base servers 200 connected to the network 10, and reproduction control devices 300 and display devices 400 connected to the base server 200.

The management server 100 is connected to the network 10 and, for example, accumulates and delivers video information and character information such as advertisements, announcements, and delivery program. The base server 200 is connected to the network 10 and, for example, receives video information or character information from the management server 100 and transmits the video information or character information to the reproduction control device 300. The reproduction control device 300 receives video information or character information from the base server 200 and performs display control of the display device 400. Based on a signal or content data received from the reproduction control device 300, the display device 400 displays video or characters in the screen. The display device 400 may be, like a display device 400-1 in FIG. 1, a display device that makes a display in a plurality of display panels as a set.

The network 10 is, for example, an IP network configured in a wide area or locally in which computer networks are interconnected using the Internet Protocol (IP) technology. The management server 100 and the base server 200 are connected to the network 10 via a router. The router also connects different computer networks or works as a relay (path control).

Figure 2:
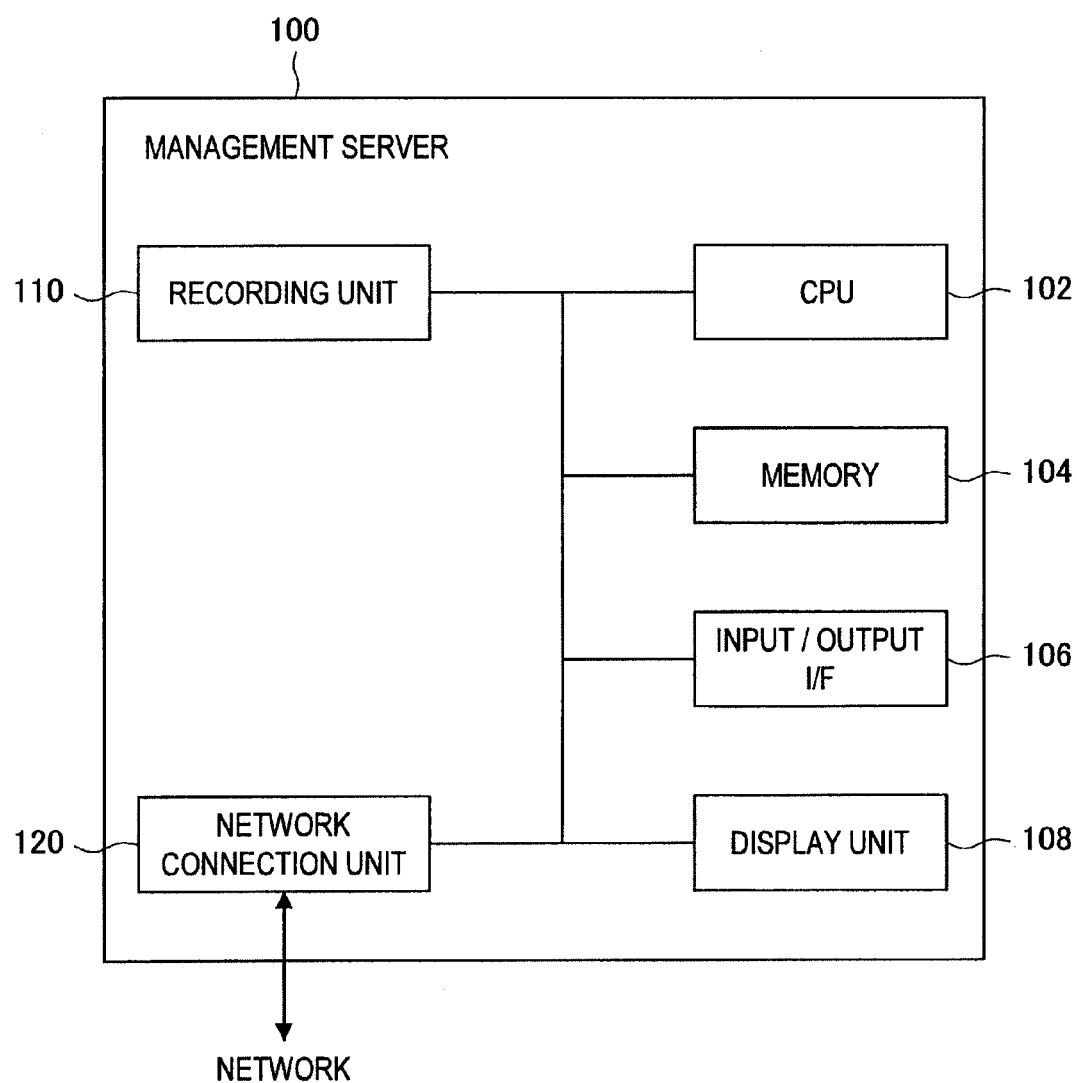
FIG. 2 is a block diagram showing a management server according to the embodiment.

Next, the management server 100, the base server 200, the reproduction control device 300, and the display device 400 will be described in detail. First, the management server 100 according to the present embodiment will be described with reference to FIG. 2. FIG. 2 is a block diagram showing the management server 100 according to the present embodiment.

The management server 100 includes, for example, a CPU 102, a memory 104, an input/output I/F 106, a display unit 108, a recording unit 110, and a network connection unit 120. The management server 100 delivers a plurality of pieces of content data to the base server 200. The management server 100 also receives information about the display result count from the base server 200 to generate a time table based on the display result count by performing automatic scheduling processing of content data.

The CPU (Central Processing Unit) 102 functions as an arithmetic processing unit and a control device using a program and can control processing of each component provided inside the management server 100. The memory 104 is constituted by a storage unit such as a RAM (Random Access Memory), ROM (Read Only Memory), and cash memory. The memory 104 has a function to temporarily store data on processing by the CPU 102 or an operating program of the CPU 102.

The input/output I/F (interface) 106 is constituted by an operation unit such as a mouse, keyboard, touch panel, button, switch, and lever and an input control unit that generates an input signal and outputs the input signal to the CPU 102. For example, the administrator of the management server 100 can input data into the management server 100 or instruct a processing operation by operating the operation unit of the input/output I/F 106.

The display unit 108 is constituted by a display device that display a video signal such as a liquid crystal display (LCD) device and organic EL display device and a sound output device that outputs an audio signal such a speaker. For example, the administrator of the management server 100 can check a result of an operation performed through the input/output I/F 106 via the display unit 108.

The recording unit 110 is constituted by, for example, an HDD (hard disk drive) or flash memory and is a recording device to store data for a long period of time. The recording unit 110 retains content data including video information and character information such as advertisements, event announcements, and delivery programs.

The network connection unit 120 is constituted by, for example, a communication line, a communication circuit, and a communication device. The network connection unit 120 can transmit and receive data between the management server 100 and the base server 200 via a computer network.

The CPU 102 also has a necessary display count acquisition unit, display result count acquisition unit, display estimated count decision unit, display time zone acquisition unit, and display start time decision unit. The necessary display count acquisition unit acquires necessary display count information about the count that predetermined content data should be displayed in the predetermined display device 400 in a displayable period of the predetermined content data. The display result count acquisition unit acquires display result count information about the display result count that the predetermined content data is displayed in the predetermined display device 400 between the start of the displayable period and the present time. The display estimated count decision unit decides the display estimated count that the predetermined content data should be displayed in the predetermined display device 400 in any period of the displayable period from the present time based on the displayable period, necessary display count information, and display result count information. The display time zone acquisition unit acquires display time zone information about the time zones in which the predetermined content data can be displayed in the predetermined display device 400. The display start time decision unit decides the display start time at which the content data is displayed in the predetermined display device 400 based on the display estimated count and display time zone information.

The CPU 102 also has a continuous display determination unit. The continuous display determination unit determines whether predetermined content data can be displayed continuously before or after other content data along the time axis based on attributes of the content data. In this case, the display start time decision unit decides the display start time based on a determination result by the continuous display determination unit.

The CPU 102 also has a proximity display determination unit. The proximity display determination unit determines, when the predetermined display device 400 is adjacent to the other display device 400, whether predetermined content data displayed in the predetermined display device 400 can be displayed simultaneously with other content data displayed in the other display device 400 or continuously before or after other content data along the time axis. In this case, the display start time decision unit decides the display start time based on a determination result by the proximity display determination unit.

The CPU 102 also has a display date attribute acquisition unit. The display date attribute acquisition unit acquires display date attribute information about attributes of dates on which predetermined content data can be displayed in the predetermined display device 400. In this case, the display start time decision unit decides the display start time based on display date attributes.

Figure 3:
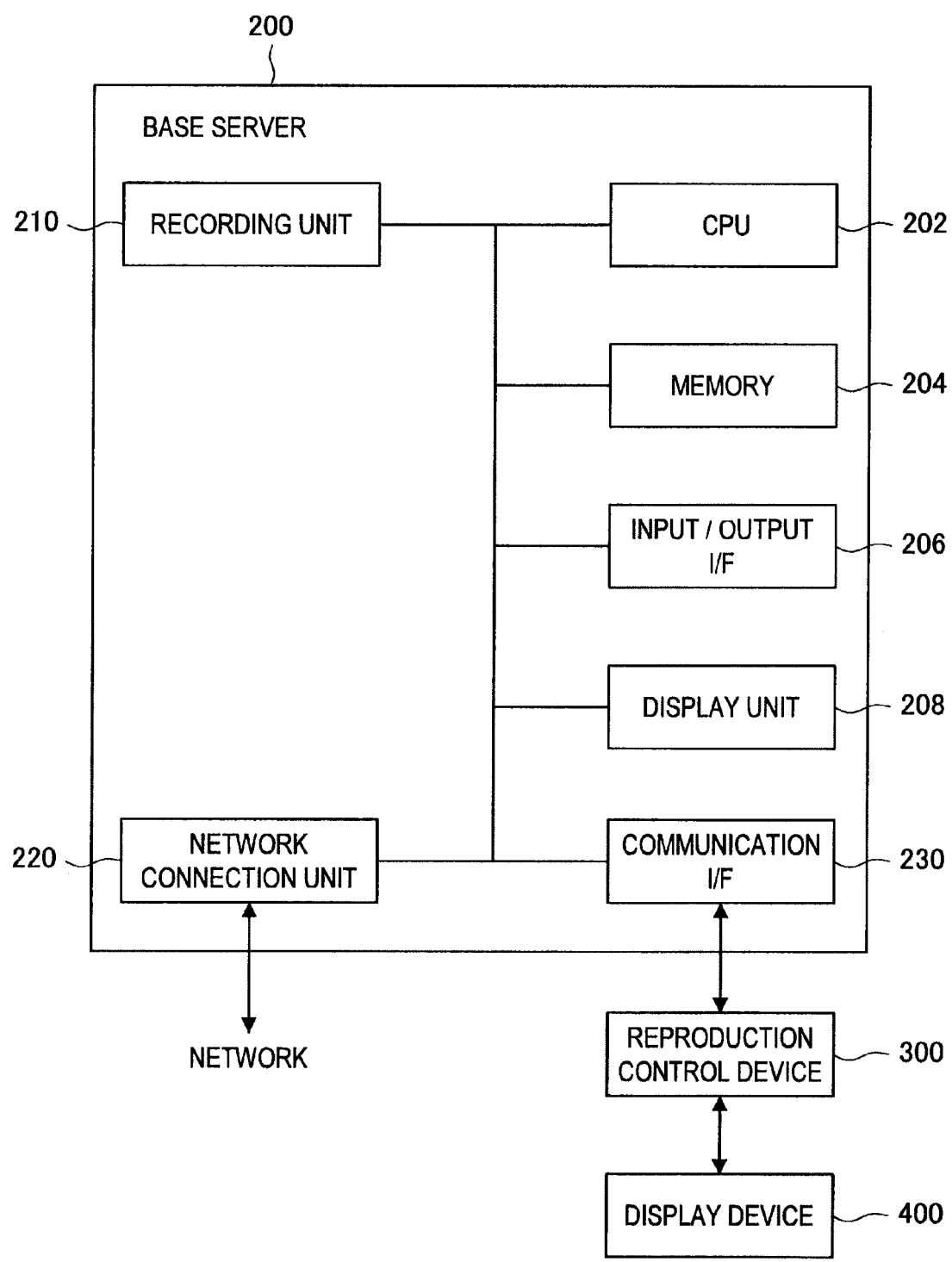
FIG. 3 is a block diagram showing a base server according to the embodiment.

Next, the base server 200 according to the present embodiment will be described with reference to FIG. 3. FIG. 3 is a block diagram showing the base server 200 according to the present embodiment.

The base server 200 includes, for example, a CPU 202, a memory 204, an input/output I/F 206, a display unit 208, a recording unit 210, a network connection unit 220, and a communication I/F 230. The base server 200 receives content data from the management server 100 and transmits the content data to one or a plurality of the reproduction control devices 300. The base server 200 also receives information about the display result count of content data from the reproduction control device 300 and sends the information about the display result count to the management server 100.

The CPU 202, the memory 204, the input/output I/F 206, the display unit 208, the recording unit 210, and the network connection unit 220 in the base server 200 are the same as the CPU 102, the memory 104, the input/output I/F 106, the display unit 108, the recording unit 110, and the network connection unit 120 in the management server 100 and thus, a detailed description thereof is omitted.

The communication I/F 230 is constituted by, for example, a communication line, a communication circuit, and a communication device. The communication I/F 230 can transmit and receive content data and the like between the base server 200 and the reproduction control device 300.

Figure 4:
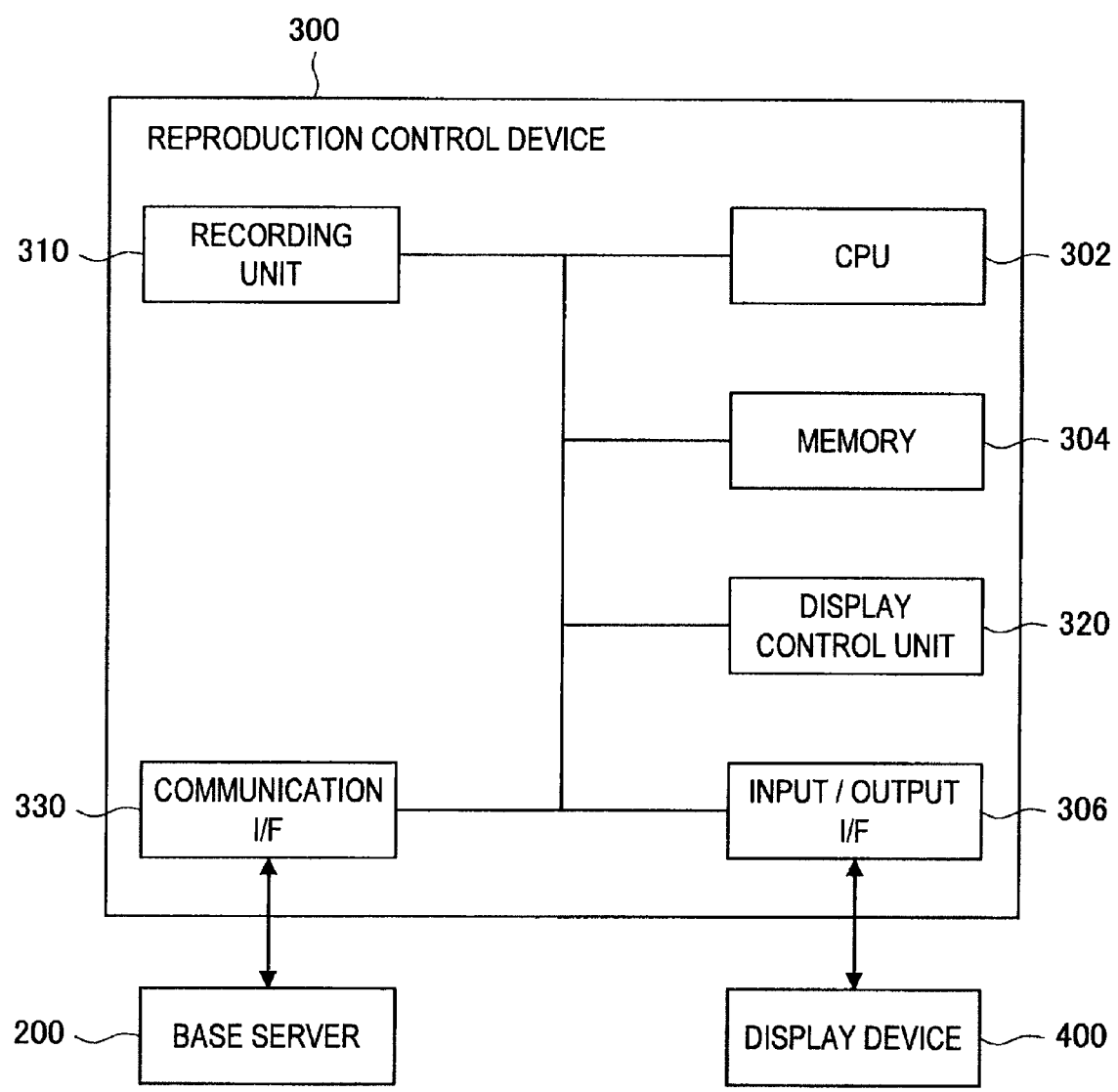
FIG. 4 is a block diagram showing a reproduction control device according to the embodiment.

Next, the reproduction control device 300 according to the present embodiment will be described with reference to FIG. 4. FIG. 4 is a block diagram showing the reproduction control device 300 according to the embodiment.

The reproduction control device 300 includes, for example, a CPU 302, a memory 304, an input/output I/F 306, a recording unit 310, a display control unit 320, and a communication I/F 330. The reproduction control device 300 receives content data from the base server 200 and transmits data for display concerning the content data to the display device 400. Based on information about a display state of content received from the display device 400, the reproduction control device 300 generates information about the display result count of content data.

The CPU 302 and the memory 304 in the reproduction control device 300 are the same as the CPU 102 and the memory 104 in the management server 100 and thus, a detailed description thereof is omitted.

The input/output I/F 306 is constituted by an operation unit such as a mouse, keyboard, touch panel, button, switch, and lever and an input control unit that generates an input signal and outputs the input signal to the CPU 302. For example, the administrator of the reproduction control device 300 can input data into the reproduction control device 300 or instruct a processing operation by operating the operation unit of the input/output I/F 306. The input/output I/F 306 is connected to the display device 400 and data for display of content data is sent to the display device 400 via the input/output I/F 306. The input/output I/F 306 also receives information about the display state of content from the display device 400.

The recording unit 310 is constituted by, for example, an HDD (hard disk drive) or flash memory and is a recording device to store data for a long period of time. The recording unit 310 detains content data delivered from the management server 100 and received via the base server 200.

The display control unit 320 controls the display device 400 so that content data recorded in the recording unit 310 can be displayed in the display device 400.

The communication I/F 330 is constituted by, for example, a communication line, a communication circuit, and a communication device. The communication I/F 330 can transmit and receive content data and the like between the base server 200 and the reproduction control device 300.

Figure 5:
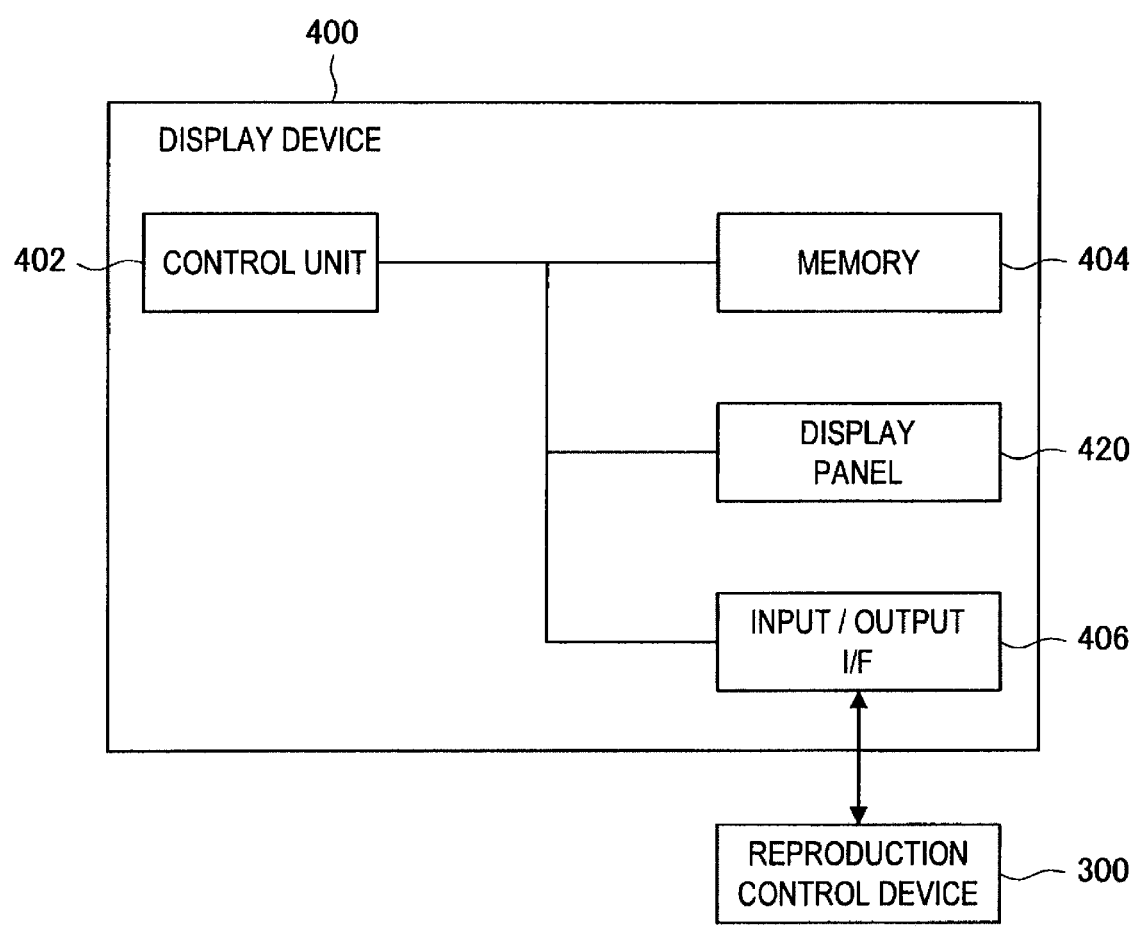
FIG. 5 is a block diagram showing a display device according to the embodiment.

Next, the display device 400 according to the present embodiment 400 will be described with reference to FIG. 5. FIG. 5 is a block diagram showing the display device 400 according to the present embodiment.

The display device 400 is a liquid crystal display, organic EL display or the like and includes, for example, a control unit 402, a memory 404, an input/output I/F 406, and a display panel 420. The display device 400 receives data for display concerning content data from the reproduction control device 300 to display video or characters in the display panel 420.

The control unit 402 exercises control to display data for display in the display panel 420. The memory 404 is constituted by a storage unit such as a RAM (Random Access Memory), ROM (Read Only Memory), and cash memory. The memory 404 has a function to temporarily store data on processing by the control unit 402 or an operating program of the control unit 402. The control unit 402 sends information about the display state of content such as power ON/OFF information of the display device 400 and error information to the reproduction control device 300.

The input/output I/F 406 is connected to the reproduction control device 300 to receive data for display of content data from the reproduction control device 300 via the input/output I/F 406. The display panel 420 has a plurality of pixels arranged therein and each pixel blinks or changes in brightness level in accordance with data for display. As a result, video or characters are displayed in the display panel 420.

[Time Table]

Figure 10:
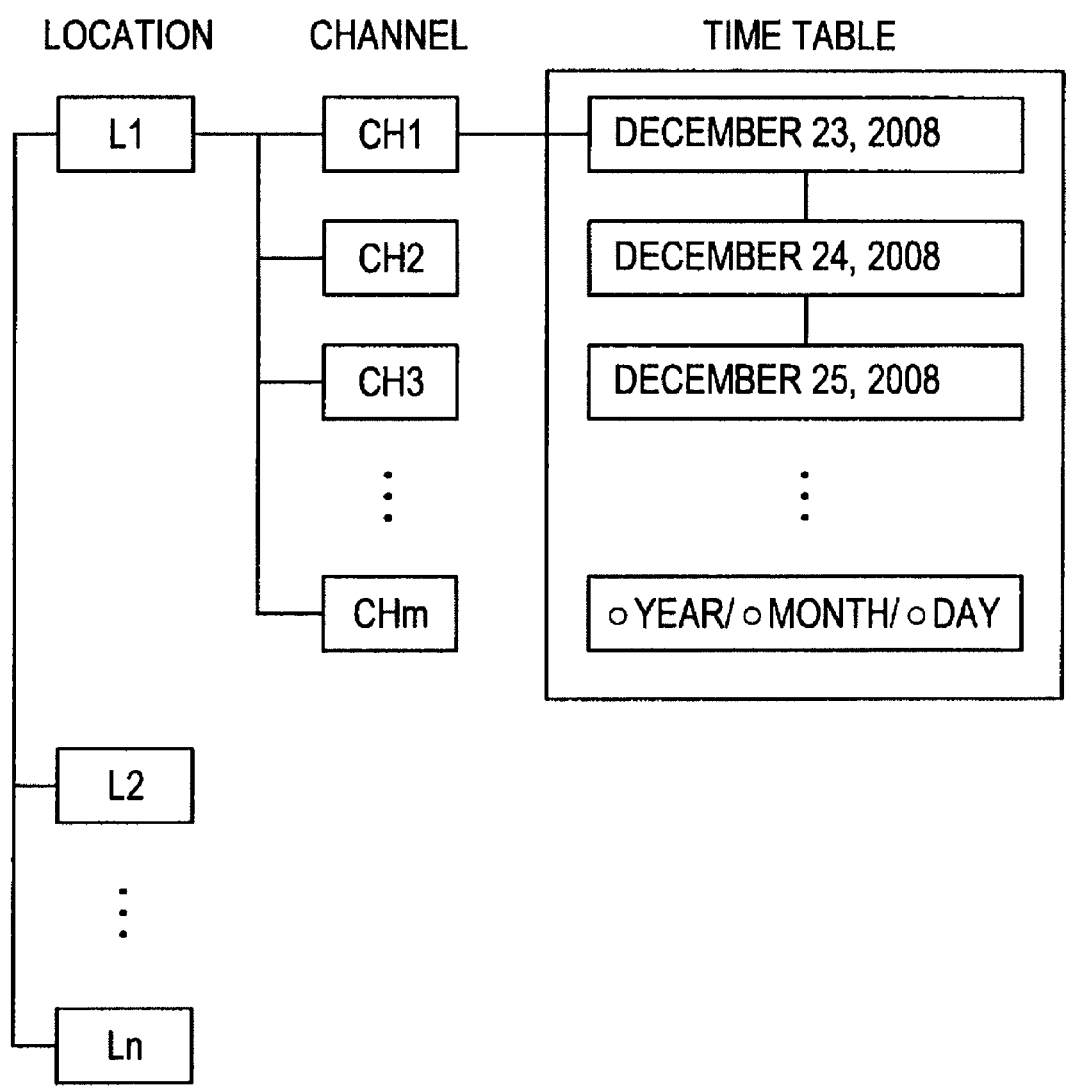
FIG. 10 is an explanatory view showing positioning of a time table.
Figure 11:
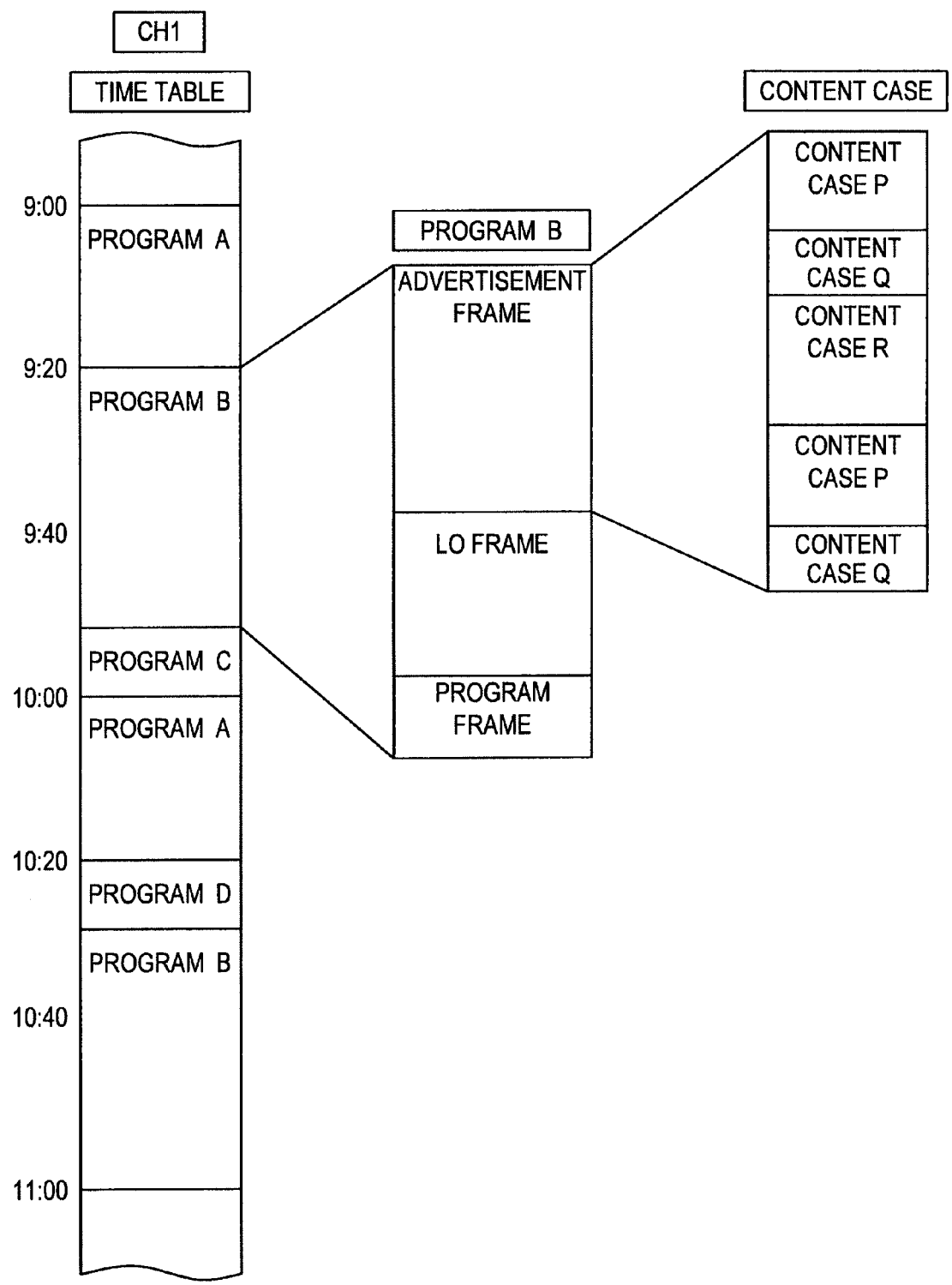
FIG. 11 is an explanatory view showing a relationship among a time table, programs constituting the time table, and content cases constituting the program.

Next, a time table generated by a digital signage providing system according to the present embodiment will be described. FIG. 10 is an explanatory view showing positioning of a time table. FIG. 11 is an explanatory view showing a relationship among a time table, programs constituting the time table, and content cases constituting the program.

The location in the present embodiment shown in FIG. 10 is a unit to manage the display in the display device 400 and is, for example, the unit of each facility such as public facilities and commercial facilities or the unit of each organization such as enterprises and municipalities. In one location, one base server 200, one or a plurality of the reproduction control devices 300 connected to the base server 200, and the display devices 400 are provided. Accordingly, a plurality of the display devices 400 in one location can be controlled as a group.

One time table is set for one channel. In the present embodiment, one or a plurality of channels is set in one location. That is, a plurality of channels can be set in one location and if the location is, for example, a commercial facility, a different channel can be provided for each salesroom. As a result, content data can be displayed according to a different time table for each salesroom.

In the present embodiment, the reproduction control device 300 is provided for each channel. Therefore, if three channels should be provided in one location, one unit of the base server 200 and three units of the reproduction control device 300 may be provided. A plurality of the display devices 400 connected to one unit of the reproduction control device 300 has the same channel. As a result, the display content and display timing of the plurality of the display devices 400 in the same channel are all the same.

A time table is set for each channel. A time table may be in units of day (24 hours), or 24 hours or less, or 24 hours or more. As shown in FIG. 11, a time table has a plurality of programs arranged in chronological order therein. In each program, a plurality of content cases is arranged in chronological order. Schedule information that specifies which content case to display in which time zone in each program is called a cue sheet. Content cases can be divided into classifications such as advertisements, location owners (LO), and delivery programs in accordance with providers or creators. A cue sheet is created by the display time zone of each classification (for example, the advertisement frame, location owner (LO) frame, and delivery program frame) being first specified and then content cases in accordance with the classification being allocated in the time zone specified for each classification. A cue sheet is created for each program.

Here, the advertisement frame is a time zone in which advertising content is displayed. Advertising content is, for example, advertisements of products or services and is provided by advertisers. The LO frame is a time zone in which LO content is displayed. LO content is, for example, information (for example, event announcements) about locations (for example, public facilities and commercial facilities) where the display device 400 is installed or installers (organizations such as enterprises) and is provided by installers of the display device 400. The delivery program frame is a time zone in which delivery program content is displayed. Delivery program content is, for example, information such as weather forecasts and news and is provided by, for example, service providers of the digital signage providing system.

[Generation of a Time Table]

Next, generation of a time table in the digital signage providing system will be described. In the description that follows, a case in which a time table is generated by the management server 100 will be described.

Figure 12:
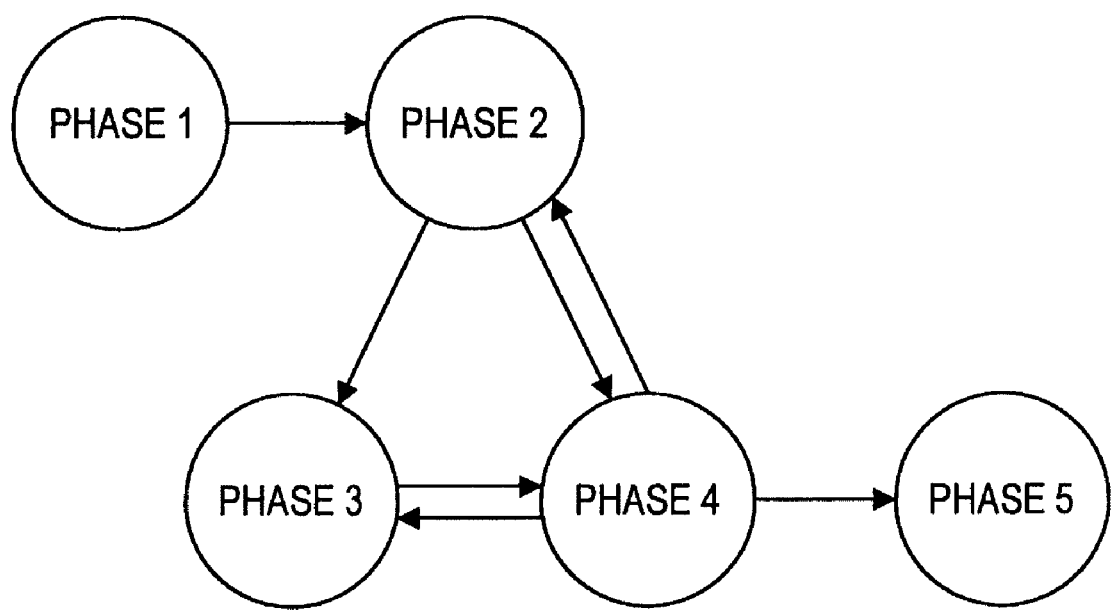
FIG. 12 is an explanatory view showing a transition of scheduling states (phases) of the time table.

First, a scheduling state of a time table will be described with reference to FIG. 12. FIG. 12 is an explanatory view showing a transition of scheduling states (phases) of a time table.

As shown in FIG. 12, the scheduling state of a time table can be divided into five states of Phase 1 to Phase 5. Phase 1 is a state in which no program is arranged in the time table. Phase 2 is a state in which after programs being arranged in the time table, allocation frames are arranged so that content can be allocated a via program. Phase 3 is a state in which content allocation via a program is completed and automatic scheduling processing is awaited. Phase 4 is a state in which content allocation via a program and automatic scheduling processing are completed and direct allocation processing can be performed. Phase 5 is a state of the time table after content being displayed.

Automatic scheduling processing is performed in a transition from Phase 3 to Phase 4. On the other hand, no automatic scheduling processing is performed in a transition from Phase 2 to Phase 4. A transition back from Phase 4 to Phase 2 or Phase 3 is possible and all content cases arranged by direct allocation processing are released. When a transition back from Phase 4 to Phase 3 occurs, all content cases arranged by automatic scheduling are released.

Figure 6:
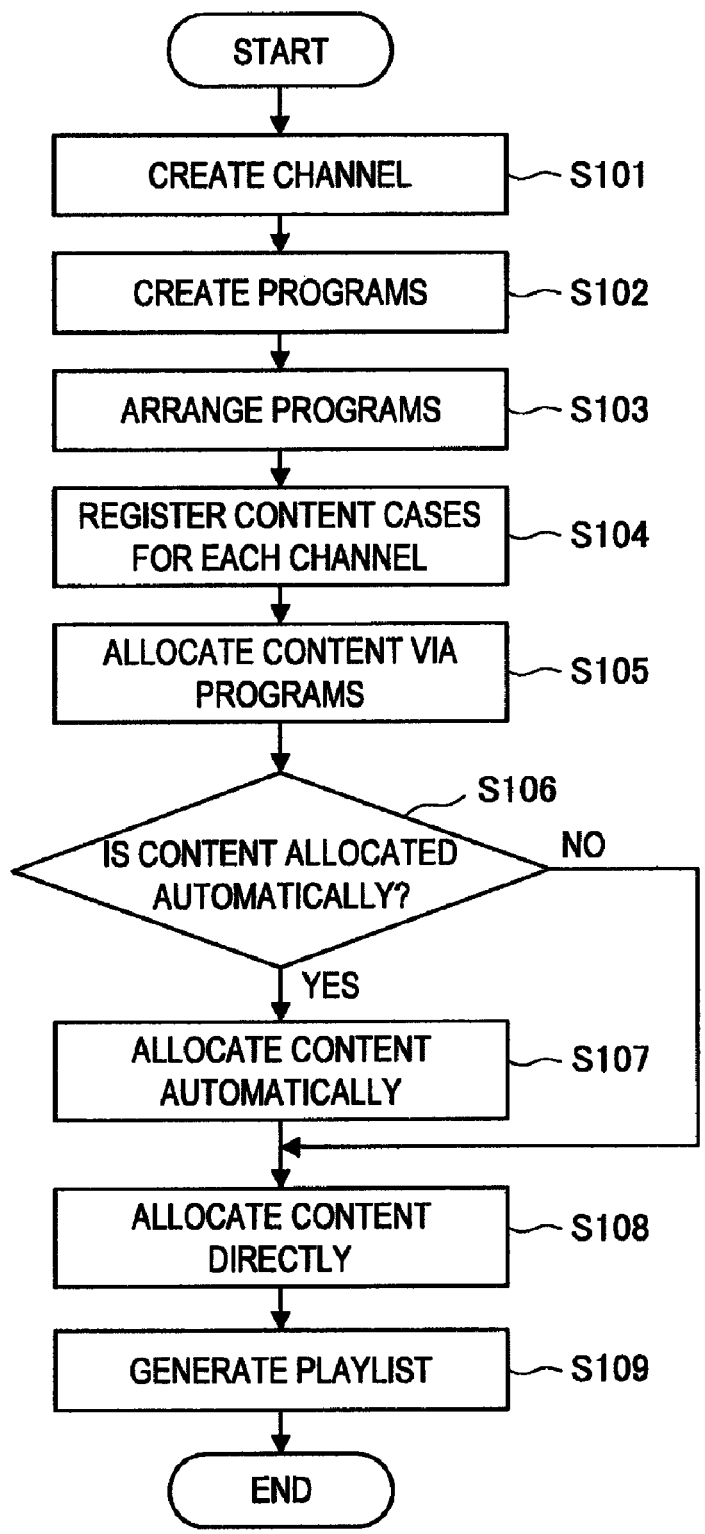
FIG. 6 is a flow chart showing a time table generation operation in the digital signage providing system.

Next, a generation operation of a time table in a digital signage providing system will be described with reference to FIG. 6. FIG. 6 is a flow chart showing a time table generation operation in the digital signage providing system.

First, a new channel is created (step S101). The channel is created corresponding to one or a plurality of the display devices 400 installed at a predetermined position in some location. If, for example, the display device 400 is installed in a perishable foods salesroom of a shop, a channel of the perishable foods salesroom can be created. A time table is created for each channel in units of, for example, one day. Then, programs can now be arranged in the time table for each channel. The channel in the present embodiment is synonymous with the channel in TV broadcasting.

Next, programs are newly created for each channel (step S102). At this point, attributes such as the program name and time are first input to register a new program. Next, a cue sheet is created for each program. That is, to decide which content to display in which time zone in a program, first allocation frames of classifications such as the advertisement frame, LO frame, and delivery program frame are arranged in the cue sheet.

Next, one or a plurality of programs created for each channel is arranged in the time table (step S103). That is, one or the plurality of programs is specified in which time zone of a day to be displayed. Then, predetermined content cases in accordance with the classification of the program are arranged for each program and thus, the time zone in which content data can be displayed is decided.

Content cases are newly registered for each channel (step S104). At this point, attributes such as the content case name, time, content provider such as an advertiser, and product are input to register a new content case. Further, display conditions for a content case are input for each content case. Display conditions include the contract period (displayable period) concerning the content display, contract count (necessary display count), margin of the contract count, and other scheduling conditions necessary for generating a time table.

Next, content allocation processing is performed. Content allocation processing is processing in which content cases are allocated in a program. First, content allocation processing via a program is performed (step S105). Content allocation processing via a program is processing in which a selected content case is arranged in a program while associating with the program. Accordingly, only by changing associations of content cases in one program, arrangements can simultaneously be changed in the other same programs arranged in the time table.

Next, whether to automatically perform content scheduling processing is determined (step S106). If automatic scheduling processing is performed, processing proceeds to automatic content scheduling processing at step S107 and if automatic scheduling processing is not performed, processing proceeds to direct content allocation processing at step S108.

In automatic scheduling processing at step S107, content cases are arranged in the time table based on different display conditions for each piece of content registered during content registration. If display conditions include priorities concerning content allocation, content is arranged in descending order of priority. As a result, content with a higher priority is more likely to satisfy the contract count.

Though not shown in FIG. 6, content cases arranged in automatic scheduling processing may be released. Accordingly, display conditions during content registration at step S104 can be input again and also new content cases can be registered. Moreover, automatic scheduling processing can subsequently be performed again. Automatic scheduling processing will further be described below.

In direct content allocation processing at step S108, content cases are arranged in the time table by the user. Direct allocation processing may be performed on a time table on which automatic scheduling processing at step S107 has been performed. Accordingly, the order of contents cases in the time table obtained after the automatic scheduling processing may be interchanged or replaced.

When the allocation processing is completed, a time table that can be used for content display of the display device 400 is generated (step S109).

[Automatic Content Scheduling Processing]

Figure 7:
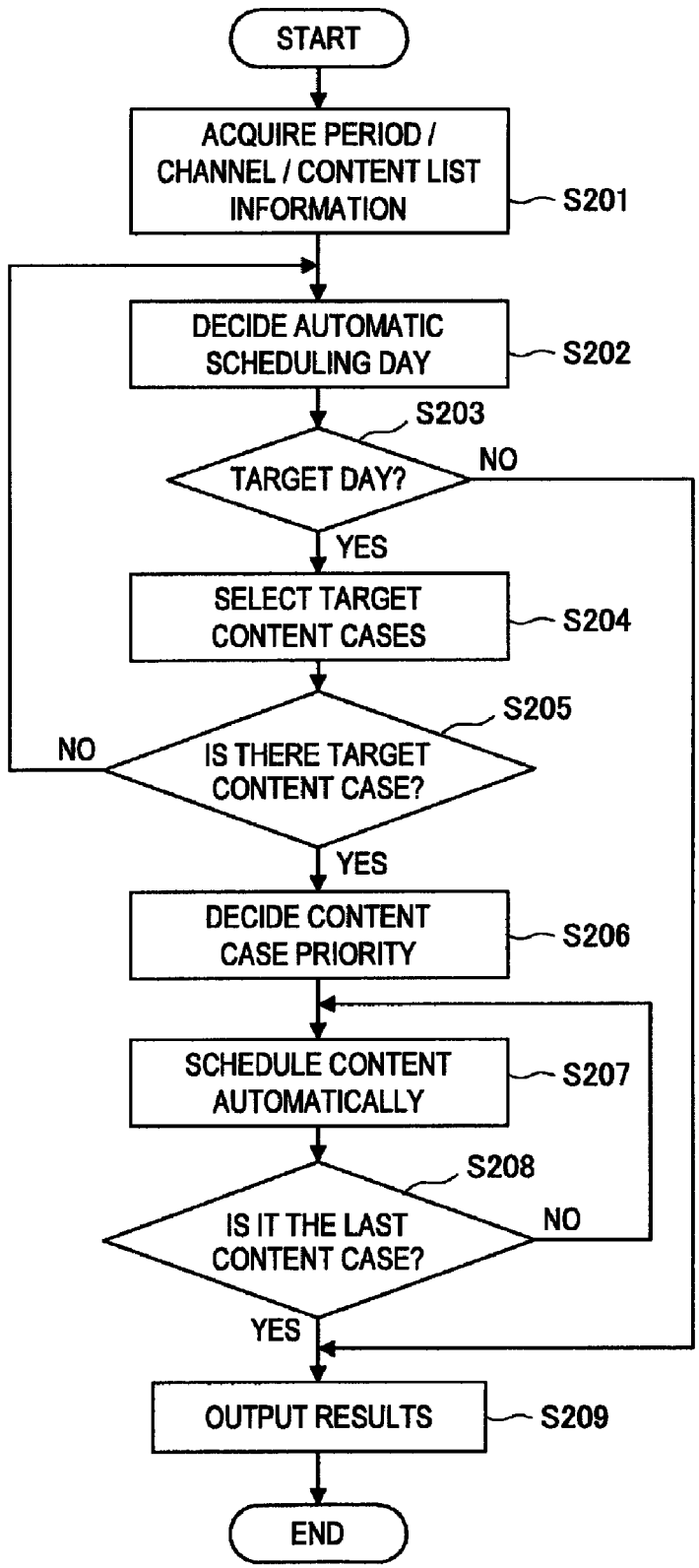
FIG. 7 is a flow chart showing automatic content scheduling processing.

Next, automatic content scheduling processing will be described in detail. First, the flow of automatic content scheduling processing will be described. FIG. 7 is a flow chart showing automatic content scheduling processing.

When automatic content scheduling processing is started, display conditions, for example, the contract period for each content case, channel to be displayed, and a list of registered content cases are acquired (step S201). Next, the automatic scheduling day, which is a day to be the target of automatic scheduling processing is decided (step S202). At this point, a plurality of days can be decided as the automatic scheduling days.

Next, the target day for automatic scheduling is determined in units of day (step S203). If the day corresponds to the target day, processing proceeds to step S204. If the day does not correspond to the target day, automatic scheduling processing will not be performed and processing proceeds to step S209 to output a result to the effect that automatic scheduling processing has not been performed.

If the day corresponds to the target day of automatic scheduling, selection processing of content cases having display conditions that the display thereof be provided on the target day is performed (step S204). For example, content cases satisfying display conditions that the display thereof be provided on the target day are those content cases that are in a display contract period and content cases in a contract period are retrieved at step S204.

Then, whether or not there is any content case that is displayed on the target day is determined (step S205). If there is no content case that is displayed on the target day, processing returns to step S203 and whether the next day is the target day of automatic scheduling is determined.

If, on the other hand, there is any content case to be displayed on the target day and particularly, if there is a plurality of content cases, the order of priority of content cases is decided (step S206). For example, content cases are allocated in the order of priority set as display conditions. Or, if the order of priority set as display conditions is the same, content cases are allocated in the order in which content cases are registered.

Next, automatic scheduling processing is performed for each content case (step S207). Detailed processing thereof will be described below. Automatic scheduling processing is sequentially performed for all content cases to be displayed on the target day (step S208). When automatic scheduling processing for the last content case is performed (when processing for all content cases is completed), a result (OK or NG for all or partially NG with details thereof) of automatic scheduling processing is output. If any other target day of automatic scheduling exists, processing returns to step S203 to perform a sequence of processing for the next target day of automatic scheduling.

[Automatic Scheduling Processing at Step S207]

Figure 8:
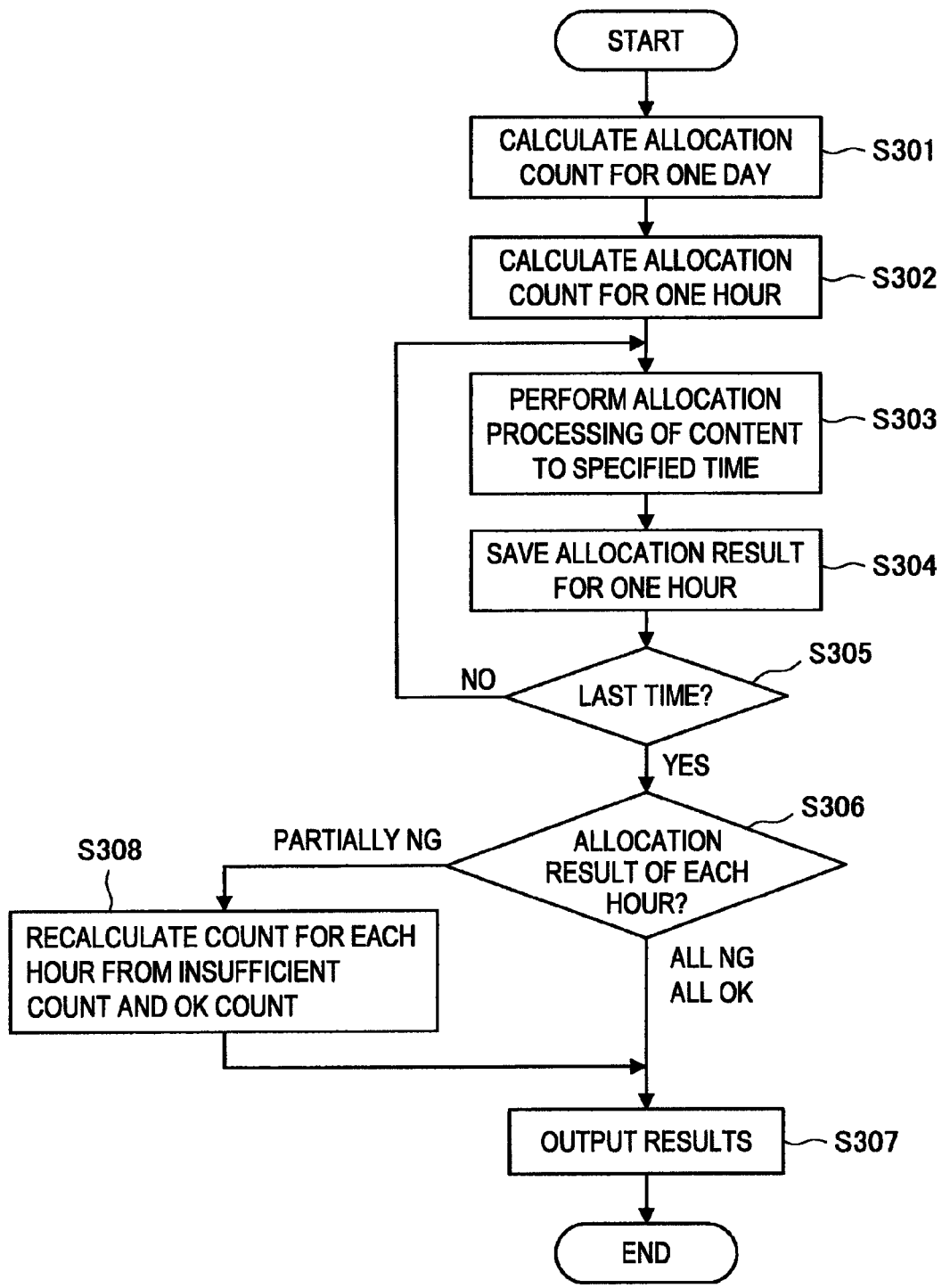
FIG. 8 is a flow chart showing an automatic scheduling processing operation at step S207 in the embodiment.
Figure 22:
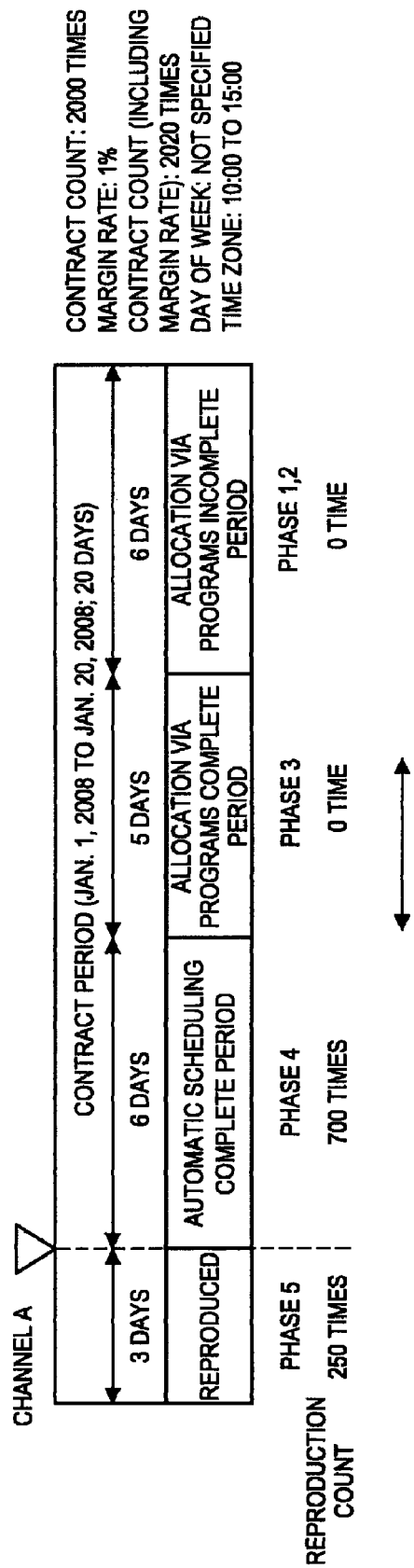
FIG. 22 is an explanatory view showing a relationship between a contract period and the scheduling state (phase) of a time table.

Next, automatic scheduling processing at step S207 described above will be described. FIG. 8 is a flow chart showing an automatic scheduling processing operation at step S207 in the present embodiment. FIG. 22 is an explanatory view showing a relationship between a contract period and the scheduling state (phase) of a time table.

First, the allocation count for one day is calculated (step S301). In the example shown in FIG. 22, the contract display period is 20 days, the contract display count is 2000 times, and the display count including a margin when the margin is set to 1% is 2020 times. The display result count is 250 times in three days and the period for which automatic scheduling is completed is six days with 700 times. Here, automatic scheduling processing is performed for the allocation via a program complete period (five days).

More specifically, the remaining allocation count, which is the contract count that has not yet been allocated, is divided by the number of remaining contract days. In the example shown in FIG. 22, the remaining allocation count is 1070 times (=2020−(250+700)) and when the number of remaining contract days is 11 days, the allocation count for one day is 97 times.

Next, the allocation count for each hour is calculated based on the allocation count for one day (step S302). More specifically, the allocation count for each hour is calculated based on the time zone setting value, which is the time zone in which content is displayed. For example, in the example shown in FIG. 22, the time zone setting value is 10:00 to 15:00 and when the allocation count for one day is 97 times, the allocation count for each hour is obtained as 19 times by dividing 97 times of the allocation count for one day by five hours.

Next, content cases are sequentially allocated to the allocable allocation frame (specified time) from the channel start time (step S303). This allocation processing will be described below.

Allocation processing is performed in units of hour and an allocation result whether allocation is accomplished as calculated at 5302 is saved (step S304). Then, content cases are allocated and an allocation result is saved till the end time of the channel (step S305). When processing in each hour is completed, whether an allocation result is all OK, all NG, or otherwise is determined (step S306).

If an allocation result is partially OK, the remaining allocation count, which is the insufficient count of failed allocation, and the time in which the result is OK are counted for each hour to perform allocation processing again in the times in which the result is OK for the insufficient count (step S308). Finally, a result of whether allocation processing in each hour is OK or NG is output with the count of NG if the result is NG (step S307).

[Allocation Processing of Content Cases to the Allocation Frame (Specified Time) at Step S303]

Figure 9:
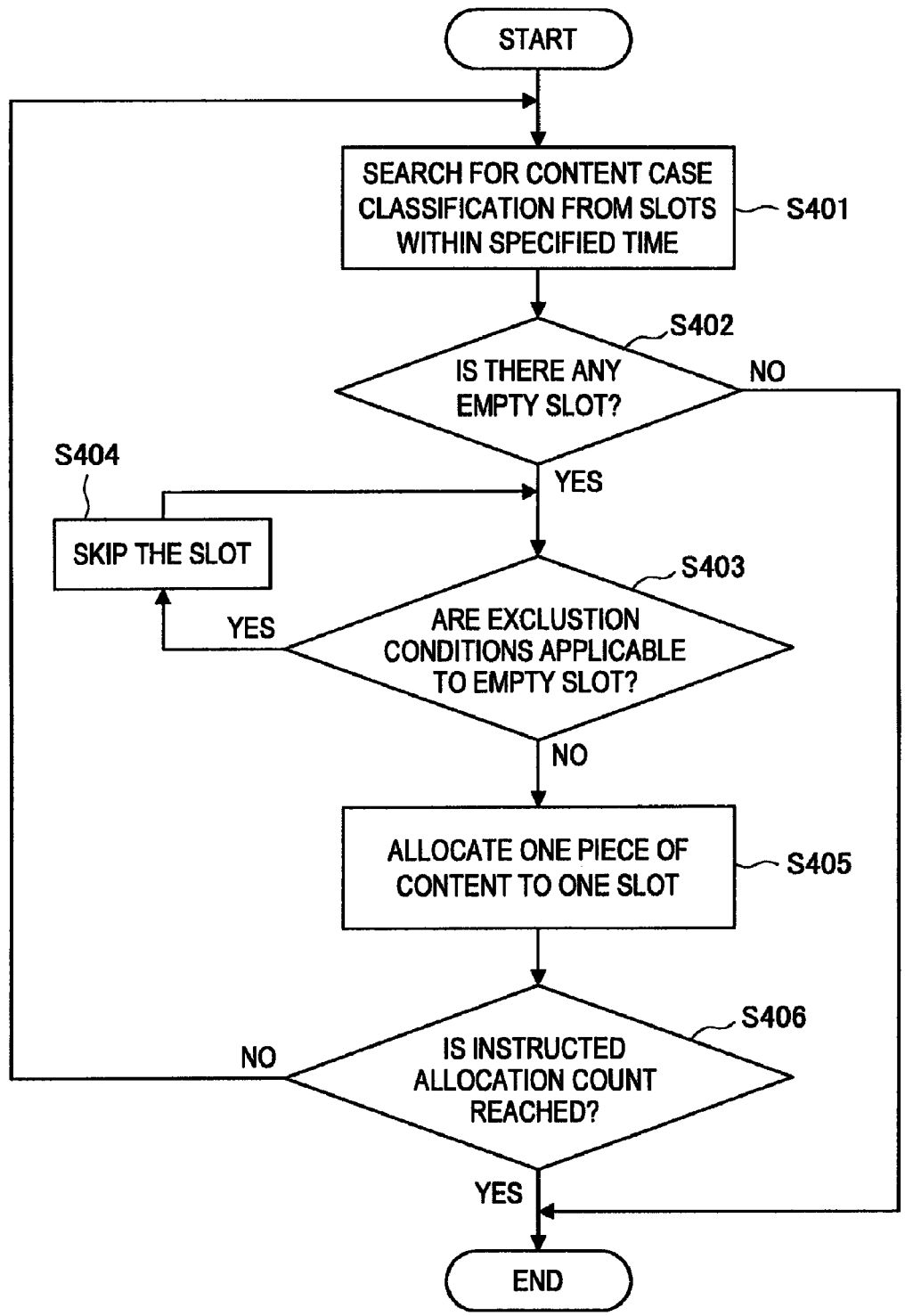
FIG. 9 is a flow chart showing an allocation processing operation of content cases to an allocation frame at step S303 in the embodiment.

Next, allocation processing of content cases to an allocation frame at step S303 will be described. FIG. 9 is a flow chart showing an allocation processing operation of content cases to an allocation frame at step S303 in the present embodiment. Allocation processing of content cases to an allocation frame at step S303 is performed in such a way that the allocation count for each hour calculated at step S302 in units of hour is satisfied.

First, the allocation frame (for example, advertisement frame, LO frame, or delivery program frame) matching the classification (for example, advertisements, LO, or delivery programs) of content cases is searched for from the start time of the time table in the time zone (in units of hour) for which allocation processing is performed (step S401). At this point, date attribute information concerning days of the week or holidays may be acquired to search for days having date attribute information matching attributes of content cases.

Then, whether any empty slot is available in the matched allocation frame is determined (step S402). That is, whether there is an empty time longer than the time of the content case to be allocated in the matched allocation frame is determined.

Next, if it is determined that an empty slot is available in the matched allocation frame, whether exclusion conditions are applicable to the content case to be allocated is determined (step S403). Exclusion conditions will be described below. If exclusion conditions are applicable, the corresponding slot is skipped and an empty slot after a predetermined period is searched for (step S404). The above steps S403 and S404 are repeated until a slot that is empty and to which exclusion conditions are not applicable is searched for.

If it is determined that a slot is empty and to which exclusion conditions are not applicable, one content case is allocated to the slot (step S405). Then, after one content case being allocated, the next empty slot is searched for after returning to step S401. Then, the process is repeated until the allocation count for each hour calculated at step S302 is reached (step S406).

If, after completing allocation processing from the start time to the end time of the time table in the time zone (in units of hour) for which allocation processing is performed, the allocation count for each hour calculated at step S302 is not reached, allocation processing is performed from the start time of the time table as a second round. In this case, allocation processing is performed to empty slots after a predetermined period from content cases allocated in the first round.

[Exclusion Conditions]

Next, the above exclusion conditions will be described. Exclusion conditions include, for example, a condition that predetermined content data is not displayed in one display device 400 continuously before or after other content data along the time axis. Or, a condition that the predetermined display device 400 is adjacent to the other display device 400, predetermined content data displayed in the predetermined display device 400 is not displayed simultaneously with other content data displayed in the other display device 400 or continuously before or after other content data along the time axis. That is, exclusion conditions are conditions for preventing an issue caused by content data being displayed side by side from arising.

Information held by content data includes, for example, "product genre" and "product classification". The product genre is a major item with respect to the product classification (minor item) and is, for example, the food/beverage and automobile. The product classification is, for example, the sauce for grilled meat, beer, medium sized vehicle, and truck.

Exclusion conditions include, for example, genre exclusion and competitive exclusion.

In the genre exclusion, specific product genres exclude from each other. For example, the order or combinations expected to cause disadvantages, discomfort, or confusion for the user are excluded. More specifically, the order or combinations of the automobile and alcohol (reminded of drunk driving), toiletry (such as residential detergents and pharmaceuticals in Category I) and foods/beverage (reminded of discomfort or accidental ingestion), health foods and ordinary foods/beverage, insurance/securities products and consumer finance (reminded of contract issues) and the like are excluded.

In the competitive exclusion, enterprises and products that are in the same type of business and compete with each other exclude from each other. If the product classifications of, for example, beer, detergents, or mobile phones are determined to be the same and competing with each other, such products are excluded. On the other hand, even though the product genre is the same, products in different product classifications may be determined not to be competing with each other. This applies to, for example, beer and shochu (Japanese spirits) in alcohol and medium sized vehicle and trucks in automobile. The competitive exclusion is determined and performed based on the product classification of content cases. Even if the product classifications are the same, the competitive exclusion is not performed for products of the same company.

[Relationship Between the Display Count and the Number of the Display Devices 400]

Figure 23:
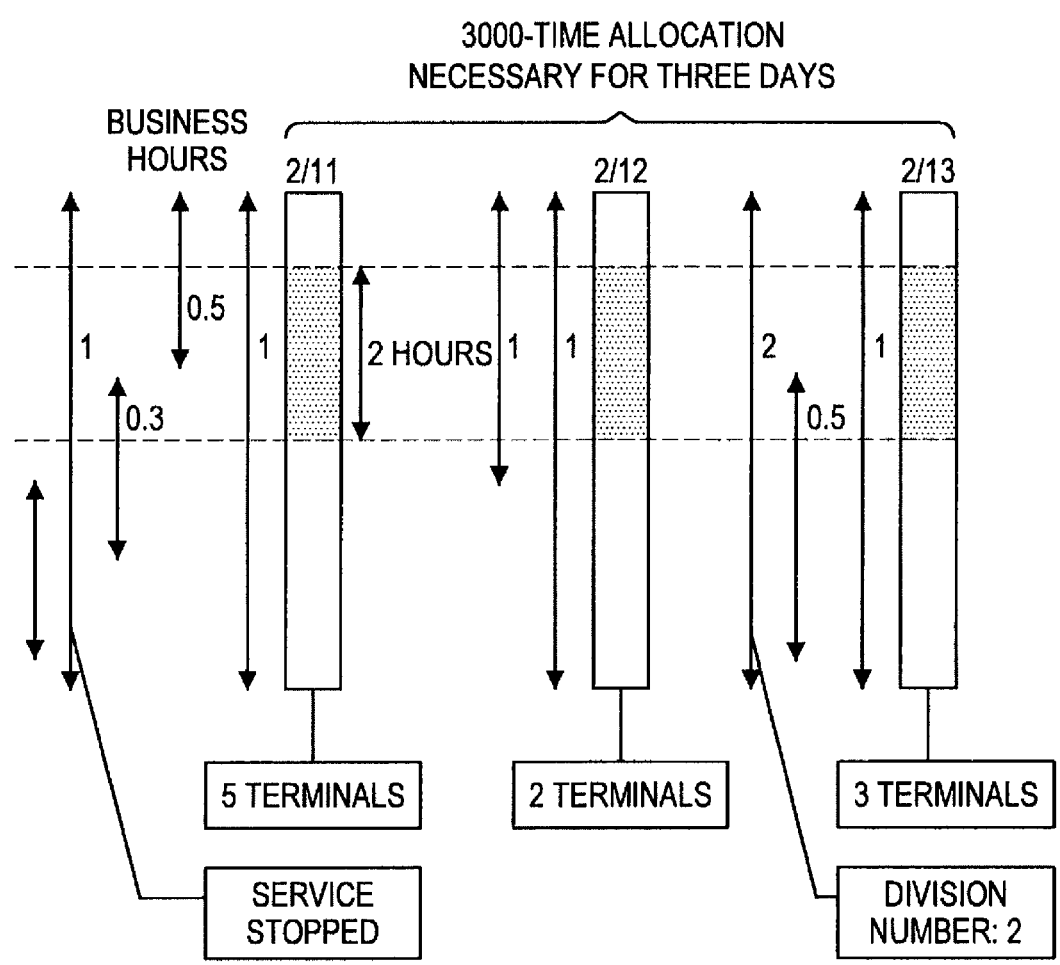
FIG. 23 is an explanatory view showing a relationship between a display time zone of the display device and a program.

Next, a relationship between the display count and the number of the display devices 400 will be described with reference to FIG. 23. FIG. 23 is an explanatory view showing a relationship between the display time zone of the display device 400 and a program. The display count is usually counted as one for one unit of the display device. Therefore, it is necessary to consider the effective number of units of the display device 400 belonging to the channel in order to derive the count for one day in automatic scheduling processing.

To count a result of the display count, the display device 400 needs to be in business hours and in a service state of the digital signage providing system. If data is divided and content is displayed in a plurality of the display devices 400, the display count is obtained after being multiplied by the number of division. For example, if data is divided into two and content is displayed in two units of the display device 400, the display count is doubled.

Two kinds of effective number of units of the display device 400, "average effective number of units" and "strict effective number of units" can be considered.

The average effective number of units is an effective number of units averaged with respect to time. When, for example, all the time between the start time and end time (the shaded 2-hour portion in FIG. 23) of allocated content cases is used for display in one unit of the display device, the average effective number of units is set as 1, when only half the time is used for display, the average effective number of units is set as 0.5, and when only 30% of the time is used for display, the average effective number of units is set as 0.3. When data is divided into two and content is displayed in two units of the display device 400, the average effective number of units is set as 2.

The example shown in FIG. 23 is taken for the description that follows. On February 11, display devices that are out of service or display device performing display in a time outside the time between the start time and end time of content cases are not considered and thus, the average effective number of units becomes 1.8 units (=0.3+0.5+1). On February 12, the average effective number of units becomes 2 units (=1+1) and on February 13, the average effective number of units becomes 3.5 units (=2+0.5+1).

The average effective number of units is used to calculate the allocation estimated count of automatic scheduling in automatic scheduling processing. This is because when the estimated count is calculated, allocation processing is not performed and the start time of content cases is not decided and thus, it is difficult to calculate the strict effective number of units and consequently, the average effective number of units is used.

When content cases are allocated for three days in FIG. 23, under the conditions of the contract display count of 3000 times in three days, the display count of 1000 times per day is not simply divided by the average effective number of units for the day. For example, it is not simply calculated such as 1000/1.8 times for February 11 and 1000/2 times for February 12. This is because if simply calculated, scheduling for each day may fluctuate depending on the number of units of the display device 400. Therefore, the display count of 1000 times (=3000/3) per day is divided by the average effective number of units of 2.43 units (=(1.8+2+3.5)/3) for three days. As a result, if 412 times (=1000/2.43) can be allocated for one day, the number of allocation for one day can be satisfied. This 412 times is the display count of content cases displayed in the time table.

However, if the average effective number of units is less than one unit, the allocation count according to the above calculation method will be too large. As a result, there is a possibility that allocation results in NG. Thus, the display target count may be calculated by assigning weights of the average effective number of units per day:

$$3000 \times 1.8/(1.8+2+3.5)+=739.7 \ldots \approx 740$$

$$3000 \times 2/(1.8+2+3.5)=821.9 \ldots \approx 822$$

$$3000 \times 3.5/(1.8+2+3.5)=1438.3 \ldots \approx 1439$$

All digits to the right of the decimal points are rounded up. If the total is not 3000 times, a correction is made.

This case yields 3000 ≠3001 (=740+822+1439). For the correction, for example, the count is adjusted in chronological order. For example, the display counts are decided like: 739 times for February 11, 822 times for February 12, and 1439 times for February 13. By calculating the number of division by assigning weights as described above, allocation processing can be performed by minimizing the possibility of NG even if the average effective number of units is small. Moreover, fluctuations in the time table are reduced.

If the start time and end time of allocated content cases are within predetermined business hours (range of arrows in FIG. 23) of the display device 400, the strict effective number of units is the number of units when the display device 400 is counted as the effective display device 400. The strict effective number of units is used when the allocation result count of automatic allocation results is calculated.

For example, the allocation result count is calculated by the strict effective number of units×the number of allocated content cases when allocation is successful (when OK) and by the strict effective number of units×the number of content cases that are successfully allocated when allocation is not successful (when NG). The calculated count is displayed in the screen as the allocation result count.

On the other hand, the allocation estimated count is calculated by the strict effective number of units×the number of allocated content cases when allocation is successful (when OK) and by the average effective number of units×the number of allocation estimated content cases when allocation is not successful (when NG). The calculated allocation estimated count is displayed in the screen as the allocation estimated count.

Whether allocation is successful or not (OK or NG) shall not be determined by comparing the allocation estimated count and the allocation result count. Whether allocation is successful or not shall be determined by whether as many content cases as the allocation number for the day calculated in advance could have been allocated.

[Screen Display when a Time Table is Generated]

Next, an input screen and an output screen when a time table is generated in a digital signage providing system will be described. These input screen and output screen are displayed, for example, in the display unit 108 of the management server 100. Then, conditions or metadata is input or processing results are checked by the user who operates the management server 100 via these screen.

Figure 13:
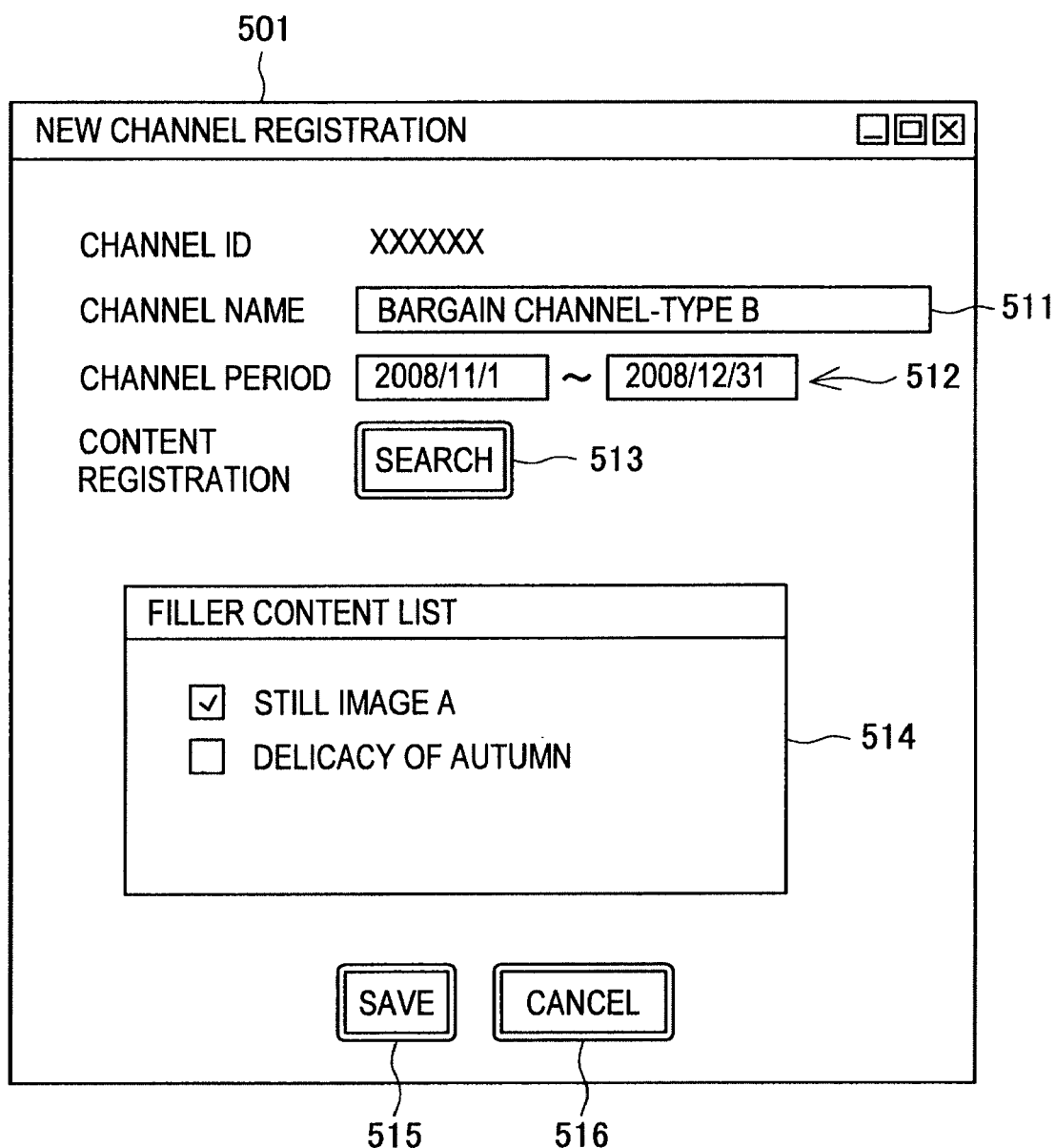
FIG. 13 is an explanatory view showing a new channel registration screen in the embodiment.

First when a channel is newly created at step S101, a new channel registration screen 501 shown in FIG. 13 is displayed. FIG. 13 is an explanatory view showing the new channel registration screen 501 in the present embodiment.

In the example shown in FIG. 13, a channel name 511 and a channel period 512, which is a period in which the channel is valid, can be input. Content (filler content) automatically arranged if there is an empty frame in which no content is arranged during scheduling can be specified from a filler content list 514. Filler content can be retrieved by a search button 513. The above input items can be determined by a save button 515 and canceled by a cancel button 516.

For example, a channel in units of day is created by the channel being newly registered. Then, programs are ready to be arranged in a time table for each channel.

Figure 14:
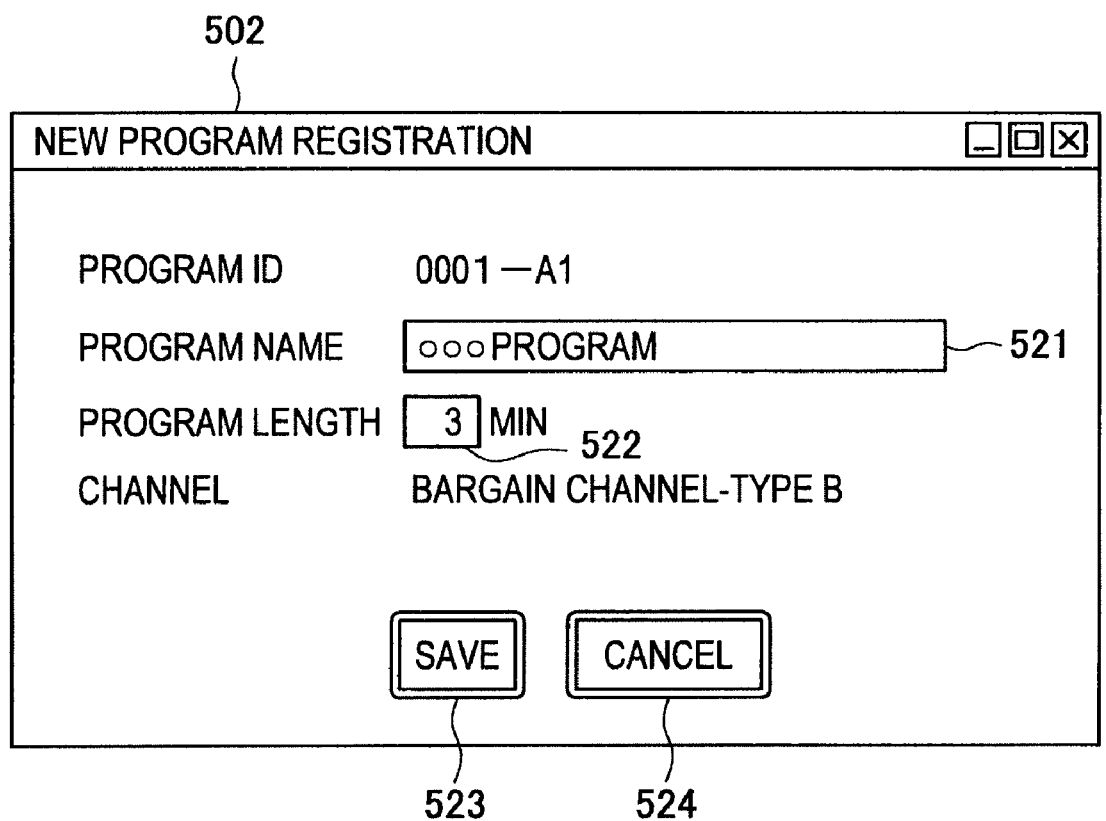
FIG. 14 is an explanatory view showing a new program registration screen in the embodiment.

When a program for each channel is created at step S102, a new program registration screen 502 shown in FIG. 14 is displayed. FIG. 14 is an explanatory view showing the new program registration screen 502 in the present embodiment.

In the example shown in FIG. 14, a program ID allocated automatically and a channel name are displayed. Then, a program name 521 and a program length 522, which is the duration of the program, can be input. The above input items can be determined by a save button 523 and canceled by a cancel button 524.

A program that can be arranged in a time table is created by the program being newly registered. Then, a cue sheet for each program is ready to be created.

Figure 15:
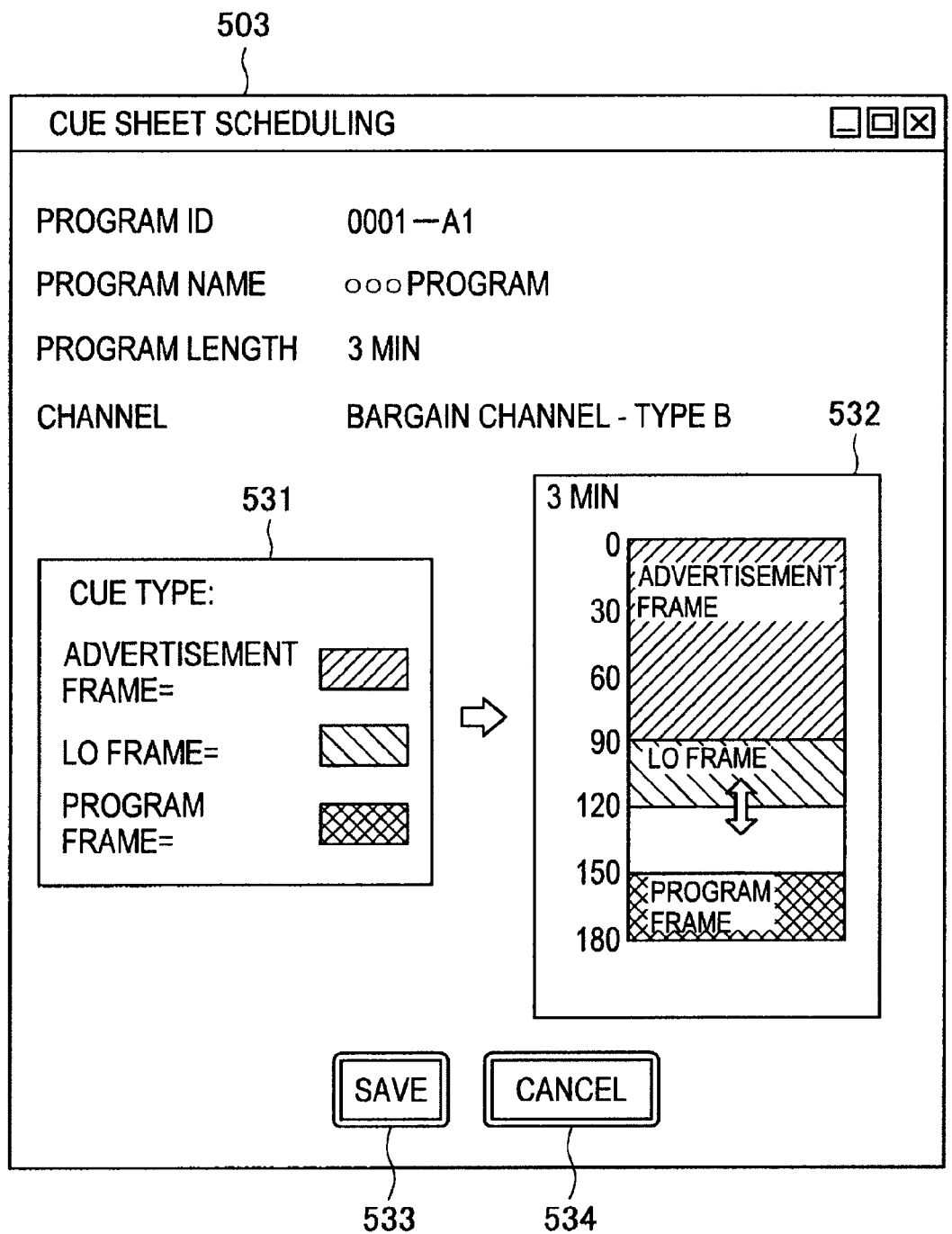
FIG. 15 is an explanatory view showing a cue sheet scheduling screen in the embodiment.

When a cue sheet for each program is created at step S102, a cue sheet scheduling screen 503 shown in FIG. 15 is displayed. FIG. 15 is an explanatory view showing the cue sheet scheduling screen 503 in the present embodiment.

In the example shown in FIG. 15, a program ID, program name, program length, and channel name are displayed. Then, an advertisement frame, LO frame, and program frame are displayed as an allocation frame classification 531 and a cue sheet 532 of the program is displayed on the right side thereof.

In the cue sheet scheduling screen 503, an allocation frame from among the allocation frame classification 531 operated and selected by using a mouse or the like can be allocated to the cue sheet 532 by dragging and dropping the allocation frame. In the cue sheet 532, the time length of the allocated allocation frame can be changed by dragging.

With a cue sheet being scheduled, which content to display in which time zone in a program is decided in units of allocation frame. Then, programs with scheduled cue sheets are now ready to be arranged in a time table.

Figure 16:
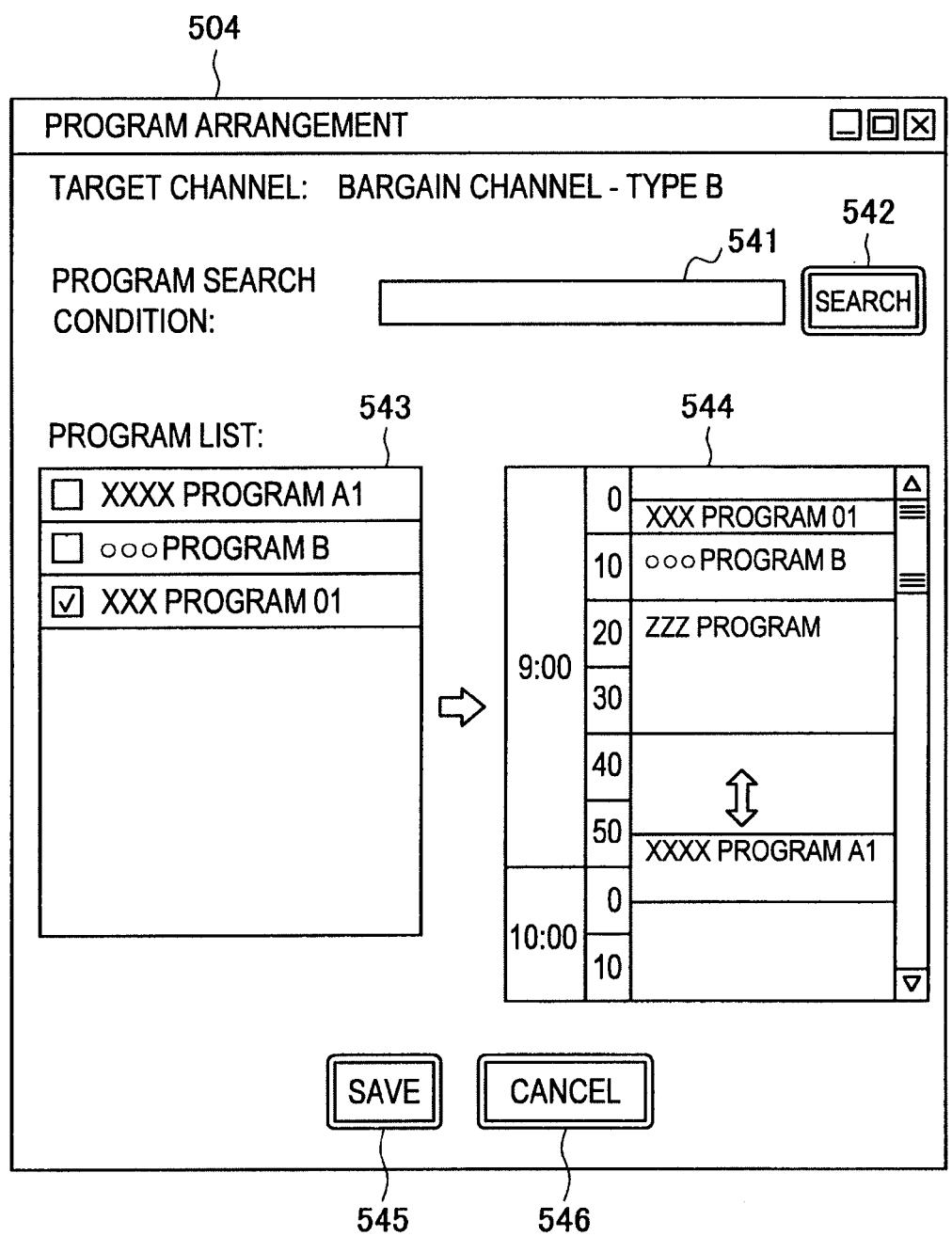
FIG. 16 is an explanatory view showing a program arrangement screen in the embodiment.

When a plurality of programs created for each channel is arranged in a time table at step S103, a program arrangement screen 504 shown in FIG. 16 is displayed. FIG. 16 is an explanatory view showing the program arrangement screen 504 in the present embodiment.

In the example shown in FIG. 16, the channel name to be a target is displayed. A search box 541 to search for the name or ID of program to be arranged and a search button 542 to start a search are displayed. Also, a list of programs 543 to be arranged is displayed and a time table 544 is displayed on the right side. In the program arrangement screen 504, one or a plurality of programs from the list of programs 543 operated and selected by using a mouse or the like can be allocated to the time table 544 by dragging and dropping such programs. In the time table 544, the allocated order of programs can be changed by dragging and dropping and a program can be copied or moved.

In which of time zones of a day one or a plurality of programs is displayed is decided by such programs being arranged in the time table.

When content cases for each channel are arranged at step S104, a content registration screen 505 shown in FIG. 17 is displayed. FIG. 17 is an explanatory view showing the content registration screen 505 in the present embodiment.

In the example shown in FIG. 17, a content case name 551, an advertiser 552, a product classification 553, a product name 554, and display conditions 555 can be input. The content case name 551, the advertiser 552, the product classification 553, and the product name 554 are meta-information of the content case. The display conditions 555 are, for example, the contract period of content, contract display count, margin, and scheduling conditions for automatic scheduling. The above input items can be determined by a save button 556 and canceled by a cancel button 557.

A new content case that can be allocated to a program is created by content being newly registered. Then, the content case is now ready to be allocated to the program.

Figure 18:
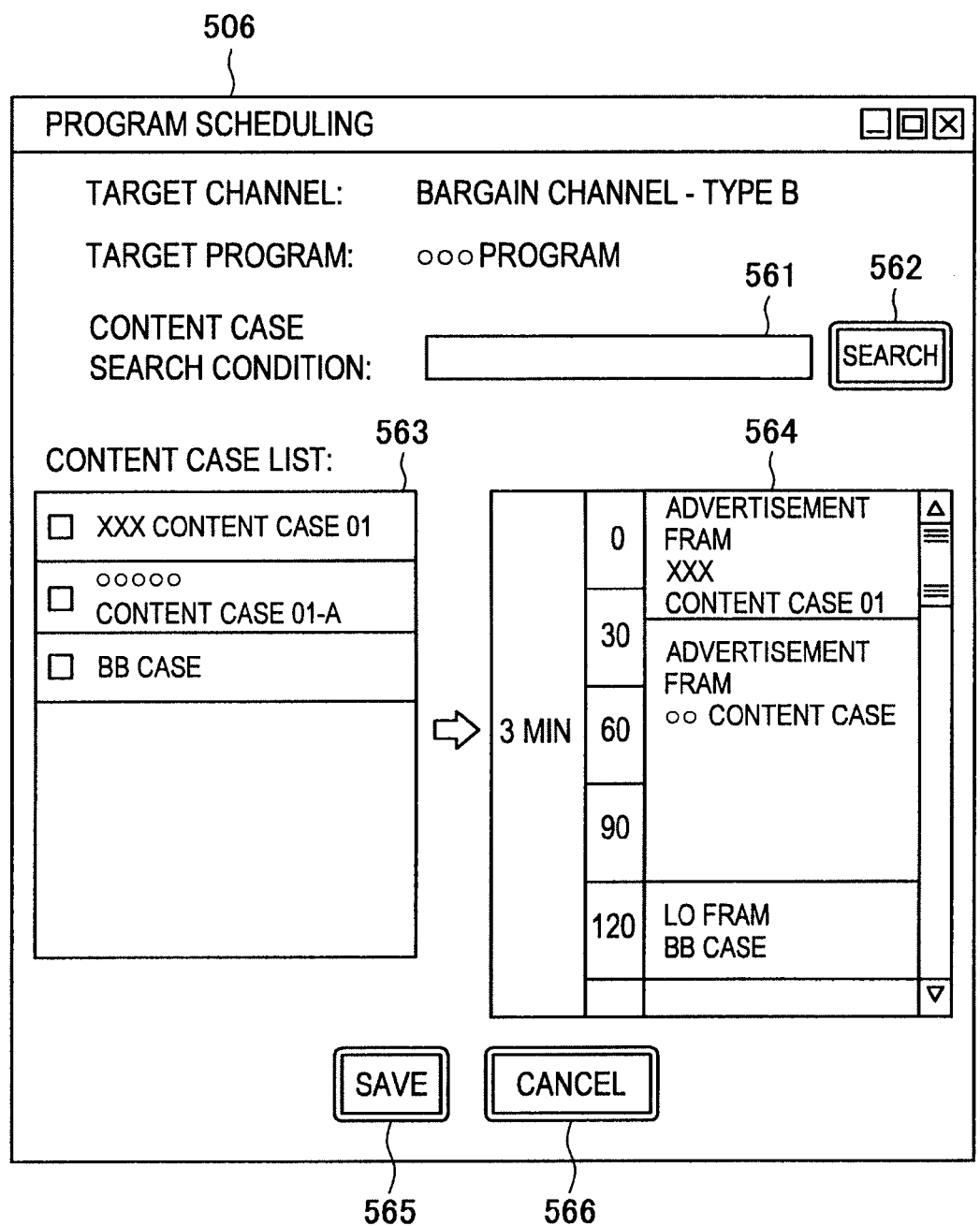
FIG. 18 is an explanatory view showing a program scheduling screen in the embodiment.

When content allocation processing to arrange content cases in a program via the program is performed at step S105, a program scheduling screen 506 shown in FIG. 18 is displayed. FIG. 18 is an explanatory view showing the program scheduling screen 506 in the present embodiment.

In the example shown in FIG. 18, a target channel name and target program name are displayed. A search box 561 to search for the name or ID of content case to be arranged and a search button 562 to start a search are displayed. Also, a list of content cases 563 to be arranged is displayed and a program 564 is displayed on the right side. In the program scheduling screen 506, one or a plurality of content cases from the list of content cases 563 operated and selected by using a mouse or the like can be allocated to the program 564 by dragging and dropping such content cases.

The selected content case can be arranged in a program by associating with the program by content allocation processing via a program being performed. Accordingly, only by changing associations of content cases in one program, arrangements can simultaneously be changed in the other same programs arranged in the time table.

Figure 19:
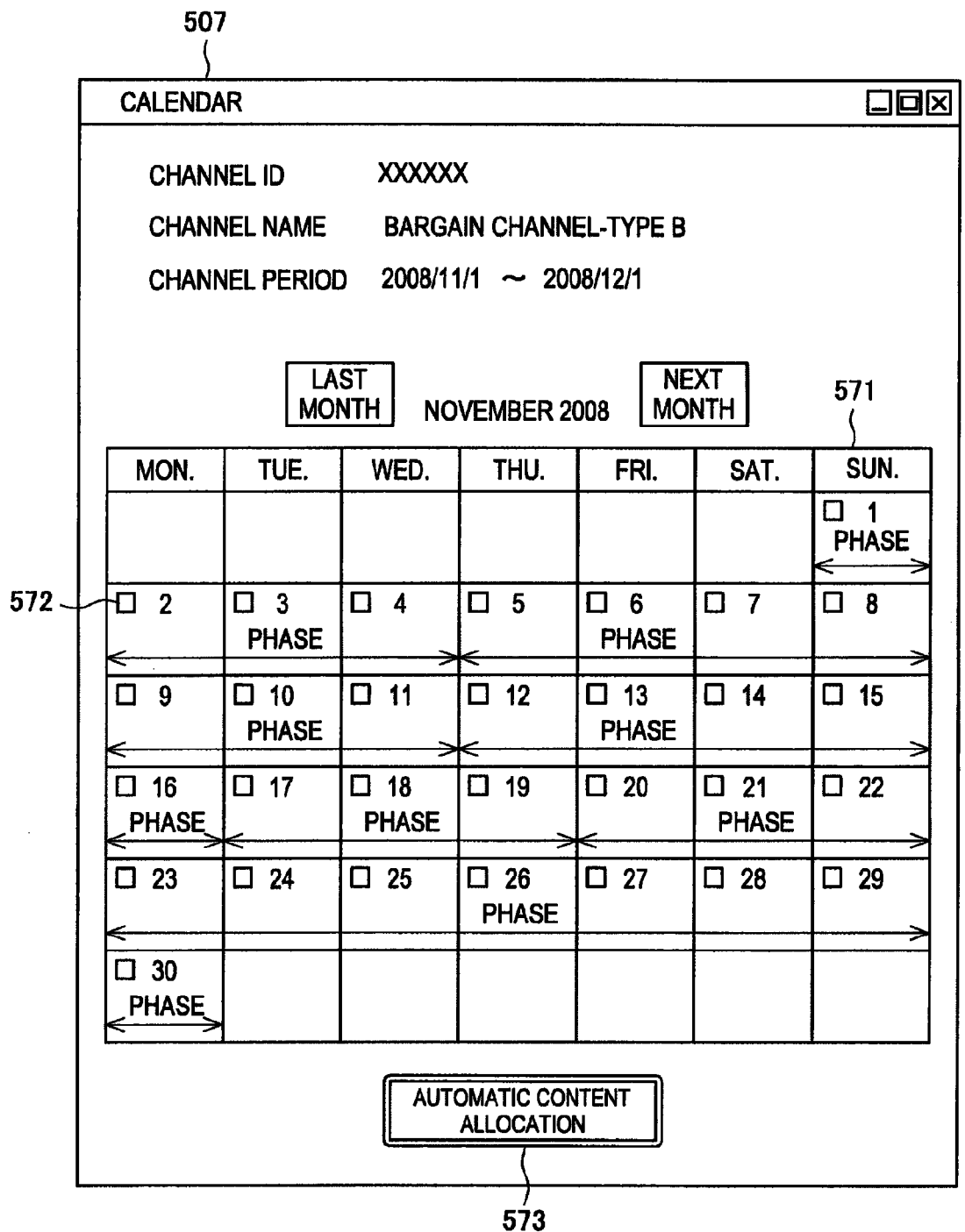
FIG. 19 is an explanatory view showing a calendar screen in the embodiment.

When automatic content allocation processing is performed at step S107, particularly automatic scheduling days that are days for automatic scheduling processing are decided and thus, a calendar screen 507 shown in FIG. 19 is displayed.

FIG. 19 is an explanatory view showing the calendar screen 507 in the present embodiment.

In the example shown in FIG. 19, a channel ID, channel name, and channel period are displayed. A calendar 571 is displayed in months. In the calendar 571, scheduling situations are displayed by arrows. Check boxes 572 are provided so that automatic scheduling days for automatic scheduling processing can be selected. If an automatic content allocation button 573 is pressed while arbitrary days are selected by the check boxes 572, the selected days are determined as automatic scheduling days for automatic scheduling processing.

Automatic scheduling processing is now ready to start after automatic scheduling days being determined.

After automatic scheduling days being determined, an automatic allocation confirmation screen 508 shown in FIG. 20 is displayed. FIG. 20 is an explanatory view showing the automatic allocation confirmation screen 508 in the present embodiment.

In the example shown in FIG. 20, a target channel, contract period, the number of display units, and content display conditions 581 are displayed. The content display conditions 581 include the contract count input for each content case, margin, result count of already being displayed, allocation count already being allocated, and remaining allocation count yet to be allocated.

After checking the above confirmation items, automatic scheduling can be started by a start button 582 and canceled by a cancel button 583.

When automatic scheduling is completed, an automatic allocation result confirmation screen 509 shown in FIG. 21 is displayed. FIG. 21 is an explanatory view showing the automatic allocation result confirmation screen 509 in the present embodiment.

In the example shown in FIG. 21, a target channel, contract period, the number of display units, content display conditions 591, and result details 592 are displayed. The content display conditions 591 further include, in addition to conditions shown in FIG. 20 such as the contract count, the necessary allocation count and execution result count. The result details display an automatic allocation result of OK or NG for each piece of content and, if NG, a reason therefor.

It should be understood by those skilled in the art that various modifications, combinations, sub-combinations and alterations may occur depending on design requirements and other factors insofar as they are within the scope of the appended claims or the equivalents thereof.

In the above embodiment, for example, a case in which a time table is generated on the management server 100 is described, but the present invention is not limited to such an example. For example, a time table may be generated on the base server 200. The base server 200 receives information about a display result count of content data from the reproduction control device 300 and generates a time table by performing an automatic scheduling processing of content data based on the display result count.

In the above embodiment, a case in which exclusion conditions are conditions that predetermined content should not be displayed continuously before or after other content data along the time axis is described, but the present invention is not limited to such an example. For example, when a time table is generated, installation conditions (for example, the installation location) of the display device 400 are acquired and, if the predetermined display device 400 and the other display device 400 are adjacent to each other, whether predetermined content data displayed in the predetermined display device 400 can be displayed simultaneously with other content data displayed in the other display device 400 or continuously before or after other content data along the time axis may be determined based on attributes of content data.

The present application contains subject matter related to that disclosed in Japanese Priority Patent Application JP 2008-254609 filed in the Japan Patent Office on 30 Sep. 2008, the entire content of which is hereby incorporated by reference.

What is claimed is:

1. An information processing apparatus, including a hardware processor, comprising:
    a necessary display count acquisition unit that acquires necessary display count information about a count that predetermined content data is displayed in a predetermined display device in a displayable period of the predetermined content data;
    a display result count acquisition unit that acquires display result count information about the display result count that the predetermined content data is displayed in the predetermined display device between a start of the displayable period and a present time;
    a display estimated count decision unit that decides the display estimated count that the predetermined content data is displayed in the predetermined display device in any period of the displayable period from the present time based on the displayable period, the necessary display count information, and the display result count information;
    a display time zone acquisition unit that acquires display time zone information about time zones in which the predetermined content data can be displayed in the predetermined display device, and
    a display start time decision unit that decides a display start time at which the content data is displayed in the predetermined display device based on the display estimated count and the display time zone information,
    wherein an allocation count for each hour is calculated based on the necessary display count information, the display result count information and the display time zone information.

2. The information processing apparatus according to claim 1, further comprising
    a continuous display determination unit that determines whether the predetermined content data is displayed continuously before or after other content data along a time axis based on attributes of the content data,
    wherein the display start time decision unit decides the display start time based on a determination result of the continuous display determination unit.

3. The information processing apparatus according to claim 1, further comprising
    a proximity display determination unit that determines, when the predetermined display device is adjacent to another display device, whether the predetermined content data displayed in the predetermined display device is displayed simultaneously with other content data displayed in the other display device or continuously before or after other content data along a time axis on attributes of content data,
    wherein the display start time decision unit decides the display start time based on a determination result of the proximity display determination unit.

4. The information processing apparatus according to claim 1, further comprising
    a display date attribute acquisition unit that acquires display date attribute information about attributes of dates on which the predetermined content data can be displayed in the predetermined display device,
    wherein the display start time decision unit decides the display start time based on the display date attributes.

5. An information processing method, comprising the steps of:
    acquiring necessary display count information about a count that predetermined content data is displayed in a predetermined display device in a displayable period of the predetermined content data;
    acquiring display result count information about the display result count that the predetermined content data is displayed in the predetermined display device between a start of the displayable period and a present time;
    deciding the display estimated count that the predetermined content data is displayed in the predetermined display device in any period of the displayable period from the present time based on the displayable period, the necessary display count information, and the display result count information;
    acquiring display time zone information about time zones in which the predetermined content data can be displayed in the predetermined display device, and
    deciding a display start time at which the content data is displayed in the predetermined display device based on the display estimated count and the display time zone information,
    wherein an allocation count for each hour is calculated based on the necessary display count information, the display result count information and the display time zone information.

6. A memory for storing a computer program, the program comprising the steps of:
    acquiring necessary display count information about a count that predetermined content data is displayed in a predetermined display device in a displayable period of the predetermined content data;
    acquiring display result count information about the display result count that the predetermined content data is displayed in the predetermined display device between a start of the displayable period and a present time;
    deciding the display estimated count that the predetermined content data is displayed in the predetermined display device in any period of the displayable period from the present time based on the displayable period, the necessary display count information, and the display result count information;
    acquiring display time zone information about time zones in which the predetermined content data can be displayed in the predetermined display device, and
    deciding a display start time at which the content data is displayed in the predetermined display device based on the display estimated count and the display time zone information,
    wherein an allocation count for each hour is calculated based on the necessary display count information, the display result count information and the display time zone information.

* * * * *